(12) United States Patent
Holloway et al.

(10) Patent No.: US 11,905,983 B2
(45) Date of Patent: Feb. 20, 2024

(54) SYSTEMS AND METHODS FOR ACTIVE CONTROL OF SURFACE DRAG USING ELECTRODES

(71) Applicant: Deep Science, LLC, Bellevue, WA (US)

(72) Inventors: Brian C. Holloway, Snoqualmie, WA (US); David William Wine, Seattle, WA (US)

(73) Assignee: Deep Science, LLC, Bellevue, WA (US)

( * ) Notice: Subject to any disclaimer, the term of this patent is extended or adjusted under 35 U.S.C. 154(b) by 357 days.

(21) Appl. No.: 17/154,763

(22) Filed: Jan. 21, 2021

(65) Prior Publication Data
US 2021/0348628 A1 Nov. 11, 2021

Related U.S. Application Data

(60) Provisional application No. 62/965,074, filed on Jan. 23, 2020.

(51) Int. Cl.
*F15D 1/00* (2006.01)
*B64C 23/00* (2006.01)
(Continued)

(52) U.S. Cl.
CPC .......... *F15D 1/0075* (2013.01); *B64C 23/005* (2013.01); *H05H 1/2406* (2013.01);
(Continued)

(58) Field of Classification Search
CPC .......... F15D 1/0075; F15D 1/007; F15D 1/12; B64C 23/005; B64C 2230/12; B64C 21/10; H05H 1/2406; Y02T 50/10
(Continued)

(56) References Cited

U.S. PATENT DOCUMENTS

| | | | |
|---|---|---|---|
| 1 | A | 7/1836 | Ruggles |
| 1,903,823 | A | 4/1933 | Lougheed |

(Continued)

FOREIGN PATENT DOCUMENTS

| | | |
|---|---|---|
| CN | 103410680 A | 11/2013 |
| CN | 103925152 A | 7/2014 |

(Continued)

OTHER PUBLICATIONS

Atlintas et al., "Direct numerical simulation of drag reduction by spanwise oscillating dielectric barrier discharge plasma force", Phys. Fluids 32, 075101 2020, 12 pages.
(Continued)

*Primary Examiner* — Minh Q Le
(74) *Attorney, Agent, or Firm* — PCFB, LLC; Justin K. Flanagan

(57) ABSTRACT

A fluid control system includes a dielectric-barrier discharge (DBD) device, and processing circuitry. The processing circuitry is configured to obtain a streamwise length scale of a fluid flowing over a surface. The processing circuitry is also configured to obtain a convective time scale of the fluid flowing over the surface. The processing circuitry is also configured to operate the DBD device, based on the streamwise length scale and the convective time scale, to adjust a flow property of the fluid.

47 Claims, 9 Drawing Sheets

(51) Int. Cl.
  *H05H 1/24* (2006.01)
  *B64C 21/10* (2006.01)
  *F15D 1/12* (2006.01)

(52) U.S. Cl.
  CPC .......... *B64C 21/10* (2013.01); *B64C 2230/12* (2013.01); *F15D 1/007* (2013.01); *F15D 1/12* (2013.01); *Y02T 50/10* (2013.01)

(58) Field of Classification Search
  USPC .... 137/803, 13; 244/205, 199.1, 200.1, 201, 244/203, 204, 99.8, 200
  See application file for complete search history.

(56) References Cited

U.S. PATENT DOCUMENTS

| | | | |
|---|---|---|---|
| 2,440,198 A | 4/1948 | Green | |
| 3,079,106 A | 2/1963 | Whitnah | |
| 3,095,163 A | 6/1963 | Hill | |
| 3,209,714 A | 10/1965 | Bowles | |
| 3,289,978 A | 12/1966 | Banaszak | |
| RE26,434 E | 8/1968 | Bowles | |
| 3,488,019 A | 1/1970 | Sonstegaard | |
| 3,578,264 A | 5/1971 | Kuethe | |
| 3,599,901 A | 8/1971 | Relkin | |
| 3,620,485 A | 11/1971 | Egon Gelhard | |
| 3,779,199 A | 12/1973 | Mayer | |
| 3,951,360 A | 4/1976 | Anxionnaz | |
| 4,102,519 A | 7/1978 | Crosby, Jr. | |
| 4,309,901 A | 1/1982 | Rolinski et al. | |
| 4,516,747 A | 5/1985 | Lurz | |
| 4,526,031 A | 7/1985 | Weisend et al. | |
| 4,611,492 A | 9/1986 | Koosmann | |
| 4,750,693 A | 6/1988 | Lobert | |
| 4,802,642 A * | 2/1989 | Mangiarotty | B64C 23/00 244/130 |
| 4,932,612 A * | 6/1990 | Blackwelder | B64C 21/04 244/209 |
| 5,037,044 A | 8/1991 | Seyfang | |
| 5,106,017 A | 4/1992 | Hicks | |
| 5,209,438 A | 5/1993 | Wygnanski | |
| 5,359,574 A | 10/1994 | Nadolink | |
| 5,365,490 A | 11/1994 | Katz | |
| 5,369,345 A | 11/1994 | Phan et al. | |
| 5,374,011 A | 12/1994 | Lazarus et al. | |
| 5,445,346 A | 8/1995 | Gilbert | |
| 5,531,407 A | 7/1996 | Austin et al. | |
| 5,540,406 A | 7/1996 | Occhipinti | |
| 5,558,156 A | 9/1996 | Tsutsui | |
| 5,558,304 A | 9/1996 | Adams | |
| 5,573,012 A | 11/1996 | McEwan | |
| 5,598,990 A | 2/1997 | Farokhi et al. | |
| 5,755,408 A | 5/1998 | Schmidt et al. | |
| 5,808,210 A | 9/1998 | Herb et al. | |
| 5,823,468 A | 10/1998 | Bothe | |
| 5,874,671 A | 2/1999 | Lopez | |
| 5,901,928 A | 5/1999 | Raskob, Jr. | |
| 5,938,404 A | 8/1999 | Domzalski | |
| 5,941,481 A | 8/1999 | Snarski | |
| 5,942,682 A | 8/1999 | Ghetzler et al. | |
| 5,953,773 A | 9/1999 | Asada et al. | |
| 5,957,413 A | 9/1999 | Glezer et al. | |
| 5,961,080 A | 10/1999 | Sinha | |
| 5,964,433 A | 10/1999 | Nosenchuck | |
| 5,975,462 A | 11/1999 | Platzer | |
| 5,988,522 A | 11/1999 | Glezer et al. | |
| 5,988,568 A | 11/1999 | Drews | |
| 6,016,286 A | 1/2000 | Olivier et al. | |
| 6,024,119 A | 2/2000 | Kirschner | |
| 6,092,766 A | 7/2000 | LaRoche | |
| 6,109,565 A | 8/2000 | King, Sr. | |
| 6,123,145 A | 9/2000 | Glezer et al. | |
| 6,123,296 A | 9/2000 | Mangalam | |
| 6,131,853 A | 10/2000 | Bauer et al. | |
| 6,215,221 B1 | 4/2001 | Cabuz et al. | |
| 6,224,016 B1 | 5/2001 | Lee | |
| 6,332,593 B1 | 12/2001 | Kamiadakis et al. | |
| 6,412,732 B1 | 7/2002 | Amitay | |
| 6,443,394 B1 | 9/2002 | Weisend, Jr. | |
| 6,457,654 B1 | 10/2002 | Glezer | |
| 6,484,971 B2 | 11/2002 | Layukallo | |
| 6,644,598 B2 | 11/2003 | Glezer et al. | |
| 6,662,647 B2 | 12/2003 | Schoess et al. | |
| 6,795,763 B2 | 9/2004 | Yao et al. | |
| 6,821,090 B1 | 11/2004 | Hassan et al. | |
| 6,837,465 B2 | 1/2005 | Lisy | |
| 6,862,502 B2 | 3/2005 | Peltz et al. | |
| 6,871,816 B2 | 3/2005 | Nugent et al. | |
| 6,874,748 B2 | 4/2005 | Hanagan | |
| 6,966,231 B2 | 11/2005 | Sheplak et al. | |
| 6,979,050 B2 | 12/2005 | Browne et al. | |
| 7,031,871 B2 | 4/2006 | Severson et al. | |
| 7,070,850 B2 | 7/2006 | Dietz | |
| 7,133,785 B2 | 11/2006 | Larson et al. | |
| 7,204,731 B2 | 4/2007 | Gusler | |
| 7,251,592 B1 | 7/2007 | Praisner et al. | |
| 7,264,202 B2 | 9/2007 | Sullivan | |
| 7,375,911 B1 | 5/2008 | Li et al. | |
| 7,380,756 B1 | 6/2008 | Enloe et al. | |
| 7,434,170 B2 | 10/2008 | Novak et al. | |
| 7,537,182 B2 | 5/2009 | Greenblatt | |
| 7,703,839 B2 | 4/2010 | McKnight et al. | |
| 7,854,467 B2 | 12/2010 | McKnight et al. | |
| 7,891,603 B2 | 2/2011 | Voorhees | |
| 7,913,928 B2 | 3/2011 | Tiliakos et al. | |
| 7,954,768 B1 | 6/2011 | Patel et al. | |
| 8,006,939 B2 | 8/2011 | McClure et al. | |
| 8,074,938 B2 | 12/2011 | Hyde et al. | |
| 8,074,939 B2 | 12/2011 | Hyde et al. | |
| 8,091,950 B2 | 1/2012 | Corke et al. | |
| 8,235,072 B2 * | 8/2012 | Roy | B64C 23/005 315/111.21 |
| 8,267,355 B1 | 9/2012 | Patel et al. | |
| 8,286,909 B2 | 10/2012 | Lee | |
| 8,308,112 B2 | 11/2012 | Wood et al. | |
| 8,382,043 B1 * | 2/2013 | Raghu | F15D 1/008 244/1 N |
| 8,436,509 B1 | 5/2013 | Branch | |
| 8,473,122 B2 | 6/2013 | Simon | |
| 8,640,995 B2 | 2/2014 | Corke et al. | |
| 8,783,337 B2 | 7/2014 | Hyde et al. | |
| 8,794,574 B2 | 8/2014 | Lang | |
| 8,894,019 B2 | 11/2014 | Alvi | |
| 8,899,514 B2 | 12/2014 | Goelet | |
| 9,002,484 B2 | 4/2015 | Hyde et al. | |
| 9,410,527 B2 | 8/2016 | Hsu | |
| 9,541,106 B1 | 1/2017 | Patel et al. | |
| 9,640,995 B2 | 5/2017 | Thorburn | |
| 9,688,395 B2 | 6/2017 | Moffitt | |
| 9,714,083 B2 | 7/2017 | Rawlings | |
| D798,219 S | 9/2017 | Xiao | |
| 9,751,618 B2 | 9/2017 | Rawlings | |
| 9,834,301 B1 | 12/2017 | Patel et al. | |
| 9,848,485 B2 | 12/2017 | Corke et al. | |
| 9,868,135 B2 | 1/2018 | Williams | |
| 9,883,822 B2 | 2/2018 | Bhagavat et al. | |
| 9,908,616 B1 | 3/2018 | Horn et al. | |
| 10,105,877 B2 | 10/2018 | Rawlings | |
| 10,118,696 B1 | 11/2018 | Hoffberg | |
| 10,495,121 B2 | 12/2019 | Smullin | |
| 10,527,074 B2 | 1/2020 | Corke et al. | |
| 10,543,908 B2 | 1/2020 | Stefes et al. | |
| 10,953,982 B2 | 3/2021 | Moffit | |
| 11,299,260 B2 | 4/2022 | Wine et al. | |
| 11,466,709 B2 * | 10/2022 | Smits | F15D 1/12 |
| 11,519,434 B2 | 12/2022 | Neiser | |
| 11,692,566 B2 | 7/2023 | Smits | |
| 2002/0079405 A1 | 6/2002 | Layukallo | |
| 2002/0125376 A1 | 9/2002 | Karniadakis | |
| 2002/0131474 A1 | 9/2002 | Suga | |
| 2004/0046086 A1 | 3/2004 | Dixon | |
| 2004/0197519 A1 | 10/2004 | Elzey et al. | |
| 2004/0249257 A1 | 12/2004 | Tupin et al. | |
| 2005/0088057 A1 | 4/2005 | Kando | |

(56) References Cited

U.S. PATENT DOCUMENTS

| | | |
|---|---|---|
| 2005/0121240 A1 | 6/2005 | Aase et al. |
| 2005/0163963 A1 | 7/2005 | Munro et al. |
| 2005/0173591 A1 | 8/2005 | Colting |
| 2005/0241605 A1 | 11/2005 | Bedwell et al. |
| 2006/0022092 A1 | 2/2006 | Miller et al. |
| 2006/0040532 A1 | 2/2006 | Ozawa et al. |
| 2006/0060722 A1 | 3/2006 | Choi et al. |
| 2006/0236777 A1 | 10/2006 | Chambers et al. |
| 2006/0266881 A1 | 11/2006 | Hughey |
| 2006/0266882 A1 | 11/2006 | Kummer |
| 2007/0018056 A1 | 1/2007 | Narramore |
| 2007/0075184 A1 | 4/2007 | Marimon |
| 2007/0095987 A1 | 5/2007 | Glezer |
| 2007/0113932 A1 | 5/2007 | Tiliakos et al. |
| 2007/0205853 A1 | 9/2007 | Taya |
| 2007/0222344 A1 | 9/2007 | Kornbluh |
| 2007/0241229 A1 | 10/2007 | Silkey et al. |
| 2008/0128027 A1 | 6/2008 | Hyde et al. |
| 2008/0128560 A1 | 6/2008 | Hyde et al. |
| 2008/0128561 A1 | 6/2008 | Hyde et al. |
| 2008/0193307 A1 | 8/2008 | Elata et al. |
| 2008/0217485 A1 | 9/2008 | Ikeda |
| 2008/0245520 A1 | 10/2008 | Hyde et al. |
| 2009/0173837 A1 | 7/2009 | Silkey et al. |
| 2010/0123046 A1 | 5/2010 | Khozikov et al. |
| 2010/0133386 A1* | 6/2010 | Schwimley ............. H05H 1/54 315/111.21 |
| 2010/0219296 A1 | 9/2010 | Shelman-Cohen |
| 2010/0229952 A1 | 9/2010 | Smith |
| 2010/0308177 A1 | 12/2010 | McClure et al. |
| 2011/0186685 A1* | 8/2011 | Tsotsis .................... F15D 1/12 428/167 |
| 2011/0224846 A1 | 9/2011 | Simon |
| 2011/0295102 A1 | 12/2011 | Lakkis et al. |
| 2012/0193483 A1 | 8/2012 | Essenhigh et al. |
| 2012/0267892 A1 | 10/2012 | Matsuda et al. |
| 2013/0001368 A1 | 1/2013 | Silkey et al. |
| 2013/0009016 A1 | 1/2013 | Fox et al. |
| 2014/0144517 A1 | 5/2014 | Raja et al. |
| 2015/0104310 A1 | 4/2015 | Griffin |
| 2015/0191244 A1 | 7/2015 | Rolston |
| 2015/0257653 A1 | 9/2015 | Hyde et al. |
| 2016/0089052 A1 | 3/2016 | Cho et al. |
| 2016/0174842 A1 | 6/2016 | Hyde et al. |
| 2017/0370387 A1 | 12/2017 | Nino |
| 2018/0298762 A1 | 10/2018 | Shelman-Cohen |
| 2019/0136881 A1 | 5/2019 | Amitay et al. |
| 2019/0145443 A1* | 5/2019 | Smullin ................ B64C 23/005 137/805 |
| 2019/0300159 A1* | 10/2019 | Kikuchi .................... B64C 9/00 |
| 2020/0031456 A1 | 1/2020 | Wine et al. |
| 2020/0148335 A1 | 5/2020 | Wine et al. |
| 2020/0176664 A1 | 6/2020 | Wine |
| 2020/0191177 A1 | 6/2020 | Wine et al. |
| 2020/0217337 A1 | 7/2020 | Loebig |
| 2021/0348628 A1 | 11/2021 | Holloway et al. |
| 2022/0260098 A1 | 8/2022 | Smits |
| 2023/0012961 A1 | 1/2023 | Marusic |
| 2023/0044837 A1 | 2/2023 | Smits |
| 2023/0304516 A1 | 9/2023 | Smits |

FOREIGN PATENT DOCUMENTS

| | | |
|---|---|---|
| EP | 1995171 A2 | 11/2008 |
| EP | 1995171 A2 | 11/2008 |
| EP | 2 012 139 A1 | 1/2009 |
| EP | 1 481 467 | 6/2010 |
| FR | 1053332 A | 2/1954 |
| WO | 2001076934 A1 | 10/2001 |
| WO | WO-01/75934 | 10/2001 |
| WO | WO-02/103304 A2 | 12/2002 |
| WO | WO-2006/040532 A1 | 4/2006 |
| WO | WO-2012/036602 | 3/2012 |
| WO | WO-2012/054086 A1 | 4/2012 |
| WO | WO-2015/024601 | 2/2015 |
| WO | WO-2016/179405 A1 | 11/2016 |
| WO | WO-2016/189448 A2 | 12/2016 |
| WO | 2020023395 A1 | 1/2020 |
| WO | 2020097114 A1 | 5/2020 |
| WO | 2021150755 A1 | 7/2021 |
| WO | 2021216152 A2 | 10/2021 |
| WO | 2022177960 A1 | 8/2022 |

OTHER PUBLICATIONS

Benard et al., "Electrical and mechanical characteristics of surface AC dielectric barrier discharge plasma actuators applied to airflow control", Exp Fluids, 2014, 55, 43 pages.

Benard et al., "Non-homogeneous streamwise wall forcing by surface plasma actuator", European Drag Reduction and Flow Control Meeting—EDRFCM 2019, Mar. 26-29, 2019, Bad Herrenalb, Germany, 2 pages.

Choi et al., "Turbulent boundary-layer control with plasma actuators", Phil. Trans. R. Soc. A, 2011, 369, pp. 1443-1458.

D'Adamo et al., "Control of the airflow close to a flat plate with electrohydrodynamic actuators", Jul. 14-18, 2002, Proceedings of ASME FEDSM'02: Flow Instabilities and Control Forum 2002 Fluids Engineering Division Summer Meeting Montreal, Quebec, Canada, 6 pages.

Duong et al., "Turbulent boundary layer drag reduction using pulsed-dc plasma actuation", Jul. 30 to Aug. 2, 2019, 11th International Symposium on Turbulence and Shear Flow Phenomena (TSFP11) Southampton, 6 pages.

Gatti et al., "Reynolds-number dependence of turbulent skin-friction drag reduction induced by spanwise forcing", J. Fluid Mech, 2016, vol. 802, pp. 553-582.

Hehner et al., "Virtual wall oscillations forced by a DBD plasma actuator operating under beat frequency—a concept for turbulent drag reduction", AIAA Aviation Forum, Jun. 15-19, 2020, 7 pages.

Jukes et al., "Turbulent boundary-layer control for drag reduction using surface plasma", 2nd AIAA Flow Control Conference, Jun. 28-Jul. 1, 2004, 11 pages.

Jukes et al., "Turbulent drag reduction by surface plasma through spanwise flow oscillation", 3rd AIAA Flow Control Conference, Jun. 5-8, 2006, 14 pages.

Kriegseis et al., "Towards in-flight applications? A review on dielectric barrier discharge-based boundary-layer control", Applied Mechanics Reviews, Mar. 2016, vol. 68, 41 pages.

Moreau et al., "Surface dielectric barrier discharge plasma actuators", ERCOFTAC Bulletin 94, 2014, 6 pages.

Moreau, "Airflow control by non-thermal plasma actuators", Phys. D: Appl. Phys., 2007, vol. 40, pp. 605-636.

Robinson, "Movement of air in the electric wind of the corona discharge", Research-Cottrell, Inc., 1960, 73 pages.

Roth et al., "Boundary layer flow control with a one atmosphere uniform glow discharge surface plasma", American Institute of Aeronautics and Astronautics, Inc., 98-0328, 1998, 28 pages.

Sato et al., "Successively accelerated ionic wind with integrated dielectric-barrier discharge plasma actuator for low voltage operation", Scientific Reports, 2019, vol. 9:5813, 11 pages.

Sontag et al., "Studies of pulsed-dc plasma actuator and its effect on turbulent boundary layers using novel optical diagnostics", AIAA SciTech, 2019, Jan. 7-11, 2019, 14 pages.

Thomas et al., "Turbulent drag reduction using pulsed-DC plasma actuation", J. Phys. D: Appl. Phys., 2019, vol. 52:434001 13 pages.

Whalley et al., "Turbulent boundary-layer control with plasma spanwise travelling waves", Experiments in Fluids, 2014, vol. 55(1796), 1-16.

Wong et al., "Turbulent boundary layer control based on DBD plasma-actuator-generated vortices", 20th Australasian Fluid Mechanics Conference, Dec. 5-8, 2016, 4 pages.

Xin et al., "Turbulent boundary layer separation control using plasma actuator at Reynolds No. 2000000", Chinese Society of Aeronautics and Astronautics & Beihang University, Chinese Journal of Aeronautics, 2016, 10 pages.

(56) References Cited

OTHER PUBLICATIONS

Ainajjar et al., "Receptivity of high-speed jets to excitation using an array of mems-based mechanical actuators", SME Fluids Engineering Division Summer Meeting, Jun. 22-26, 1997, pp. 1-6.
Alfredsson et al., "Large-eddy breakup devices—a 40 years perspective from a stockholm horizon", Flow Turbulence Combust, 2018, vol. 100, pp. 877-888.
Bird et al., "Compliant kagome lattice structures for generating in-plane waveforms", 2018, vol. 41, No. 142, pp. 86-101.
Bird et al., "Experimental control of turbulent boundary layers with in-plane travelling waves", Flow Turbulence Combust, 2018, vol. 100, pp. 1015-1035.
Bird et al., "In-plane forcing of a turbulent boundary layer, through the actuation of a compliant structure", DRFCM, 2015, pp. 1-2.
Braslow, "A History of suction-type laminar-flow control with emphasis on flight research", 1999, pp. 1-84.
Bushnell, "Chapter VIII : compliant surfaces introduction", Viscous Flow Drag Reduction, 1980, pp. 687-390.
Cattafesta et al., "Actuators for active flow control", Annu. Rev. Fluid Mech., 2001, vol. 43, pp. 247-272.
Chamorro et al., "Drag reduction of large wind turbine blades through riblets: evaluation of riblet geometry and application strategies", Renewable Energy, 2013, vol. 50, pp. 1095-1105.
Corke et al., "Active and passive turbulent boundary layer drag reduction", AIM Journal, 2018, vol. 56, pp. 3835-3847.
Gad-El-Hak et al., "Separation control: review", Journal of Fluids Engineering, 1991, vol. 13, pp. 5-30.
Gad-El-Hak, "Chapter 9: drag reduction using compliant walls", Flow Past Highly Compliant Boundaries and in Collapsible Tubes, Eds. Carpenter and Pedley, Mar. 26-31, 2001, pp. 191-229.
Garcia-Mayoral et al., "Drag rReduction by riblets", Phil Trans. R. Soc A, 2011, vol. 369, pp. 1412-1427.
Gatti, "Turbulent drag reduction at moderate reynolds number via spanwise velocity waves", PAMM, 2012, 133 pages.
Gouder, "Turbulent friction drag reduction using electroactive polymer surfaces", Doctoral Thesis, Imperial College, May 2011.
Grosjean et al., "Micro balloon actuators for aerodynamic control", IEEE Proceedings MEMS 98, Jan. 25-28, 1998, pp. 1-6.
Hong et al., "Turbulent drag reduction with polymers in rotating disk flow", Polymers, vol. 7, pp. 279-1298.
Huang et al., "MEMS transducers for aerodynamics-a paradym shift", 38th Aerospace Sciences Meeting, 2000, pp. 1-7.
Hurst et al., "The effect of reynolds number on turbulent drag reduction by streamwise travelling waves", J. Fluid Mech., 2014, vol. 759, pp. 28-55.
Jones et al., "Modelling for robust feedback control of fluid flows", Journal of Fluid Mechanics, 2015, vol. 769, pp. 1-34.
Jung et al., "Suppression of turbulence in wall-bounded flows by high-frequency spanwise oscillations", Phys_ Fluids A, 1992, vol. 4, No. 8, pp. 1605-1607.
Kang et al., "Active wall motions for skin-friction drag reduction", Physics of Fluids, 2000, vol. 12, No. 12, pp. 3301-3304.
Karniadakis et al., "Mechanism on transverse motions in turbulent wall flows", Annu. Rev. Fluid Mech., 2003, vol. 35, pp. 45-62.
Kasagi et al., "Toward cost-effective control of wall turbulence of skin friction drag reduction", Advances in Turbulence XII, 2009, pp. 189-200.
Kline et al., "The structure of turbulent boundary layers", Journal of Fluid Mechanics, 1967, vol. 30, pp. 741-773.
Laadhari et al., "Turbulence reduction in a boundary layer by a local spanwise oscillating surface", Physics of Fluids, 1994, vol. 6, pp. 3218-3220.
Lee et al., "Control of roll moment by MEMS". American Society of Mechanical Engineers, 1996, pp. 1797-1803.
Leschziner, "Friction-drag reduction by transverse wall motion—a review", J. of Mechanics, DOI: 10.1017/mech.2020_31, 15 pages.
Luhar et al., "A framework for studying the effect of compliant surface on wall turbulence", J. Fluid Mech., 2015, vol. 768, pp. 415-441.

Mahfoze et al., "Skin-friction drag reduction in a channel flow with streamwise-aligned plasma actuators," Intl J. of Heat and Fluid Flow, Butterworth Scientific LTD., Guildford, GB, 2017, vol. 66, pp. 83-94.
Marusic et al., "Predictive model for wall-bounded turbulent flow", Science, 2010, vol. 329, No. 5988, pp. 193-196.
Mathis et al., "Estimating wall-shear-stress fluctuations given an outer region input", Journal of Fluid Mechanics, 2013, vol. 715, pp. 163-180.
Melton et al., "Active flow control via discrete sweeping and steady jets on a simple-hinged flap", Aug. 2018, IM Journal, vol. 56, No. 8, pp. 2961-2973.
Morrison, "MEMS devices for active drag reduction in aerospace applications", Electronic and Optical Materials, 2014, pp. 153-176.
Naguib et al., "Arrays of MEMS-based actuators for control of supersonic jet screech", AIM, Jun. 29-Jul. 2, 1997, pp. 1-9.
Panton, "Overview of the self-sustaining mechanisms of wall turbulence", Prog. Aerosp. Sci., 2001, vol. 37, pp. 41-383.
Quadrio et al., "Streamwise-traveling waves of spanwise wall velocity for turbulent drag reduction", 2009, vol. 627, pp. 161-178.
Quadrio, "The laminar generalized stokes layer and turbulent drag reduction", J. Fluid. Mech., 2011, vol. 667, pp. 135-157.
Ricco, "Active and passive turbulent drag reduction", Workshop on Turbulent Skin Friction Drag Reduction, Imperial College London, Dec. 4-5, 2017, pp. 1-60.
Sareen et al., "Drag reduction using riblet film applied to airfoils for wind turbines", 49th Aerospaces Sciences Meeting, Jan. 4-7, 2011, pp. 1-19.
Schoppa et al., "A large-scale control strategy for drag reduction in turbulent boundary layers", Physics of Fluids , 1998, vol. 10, No. 5, pp. 1049-1051.
Schroder, "Drag reduction via transversal wave motions", Institute of Aerodynamics, 2017, pp. 1-22.
Shen, "Turbulent flow over a flexible wall undergoing a streamwise travelling wave motion", J. Fluid Mech., 2003, vol. 484, pp. 197-221.
Smith et al., "The characteristics of low-speed streaks in the near-wall region of a turbulent boundary layer", Journal of Fluid Mechanics, 1983, vol. 129, pp. 27-54.
Smits et al., "High reynolds number wall turbulence", Annu. Rev. Fluid Mech., 2011, vol. 43, pp. 353-375.
Symeonidis et al., "Drag reduction in wall-bound turbulence via a transverse travelling wave", J. Fluid Mech., 2002, vol. 457, pp. 1-34.
Tamano, "Turbulent drag reduction due to spanwise traveling waves with wall deformation", Nov. 20, 2014, or 1779 Symposium, pp. 1-51.
Thomas et al., "Turbulent drag reduction using pulsed-DC plasma actuation", J. of Physics D: Appl. Phys., 2019, vol. 52, No. 34001, 13 pages.
Tomiyama et al., "Direct numerical simulation of drag reduction in a turbulent channel flow using spanwise traveling wave-like wall deformation", Physics of Fluids, 2013, vol. 25, pp. 1-22.
Tsao, "An integrated mems system for turbulent boundary layer control", IEEE Solid State Sensors and Actuators, 1997, pp. 1-4.
Tsao, "Micromachined magnetic actuators for active fluid control", International Mechanical Engineering Congress and Exposition, 1994, pp. 31-38.
Van Buren et al., "Piezoelectric driven oscillating surface (PDOS)", RPI, 2014, 6 pages.
Viotti et al., "Streamwise oscillation of spanwise velocity at the wall of a channel for turbulent drag reduction", Physics of Fluids, 2009, vol. 21, pp. 1-9.
Wang, "Flow over a surface with parallel grooves", May 2003, vol. 15, No. 5, pp. 1114-1121.
Yang et al., "Micro bellow actuators", IEEE International Solid State Sensors and Actuators Conference, 1997, pp. 1-4.
Zhao et al., "Turbulent drag reduction by traveling wave of flexible wall", Fluid Dynamics Research, 2004, vol. 34, pp. 175-198.
Zhong et al., "Reduction of pressure losses in a linear cascade using herringbone riblets", School of Mechanical, Aerospace and Civil Engineering, University of Manchester, Aug. 17, 2017, 16 pages.

(56) References Cited

OTHER PUBLICATIONS

Abbas Adel et al., "Drag reduction via turbulent boundary layer flow control", Science China Technological Sciences, Science China Press, Heidelberg, Jul. 19, 2017, vol. 60, No. 9, pp. 1281-1290.
International Search Report and Written Opinion dated Nov. 24, 2021, PCT Application No. PCT/US2021/014722, 25 pages.
Stroh, "Reactive control of turbulent wall-bounded flows for skin friction drag reduction", KIT Scientific Publishing, Dec. 11, 2015, pp. 1-214.
Wang et al., "Recent developments in DBD plasma flow control", Progress in Aerospace Sciences, 2013, vol. 62, pp. 52-78.
Examination Report issued on GB0911332.5 dated Mar. 31, 2011, 4 pp.
Examination Report issued on GB0911333.3 dated Oct. 25, 2010, 2 pp.
International Patent Application PCT/US2019/063409, International Search Report and Written Opinion dated Feb. 21, 2020, 11 pp.
International Patent Application PCT/US2021/014417, International Search Report and Written 4 Opinion dated May 3, 2021, 14 pp.
International Patent Application PCT/US2022/016560, International Search Report and Written Opinion dated May 30, 2022, 10 pp.
International Patent Application PCT/US2019/042832, International Search Report dated Nov. 4, 2019, 3 pp.
International Patent Application PCT/US2019/059919, International Search Report dated Apr. 15, 2020, 17 pp.
U.S. Appl. No. 16/674,870, Non-Final Office Action dated May 26, 2022, 22 pp.
U.S. Appl. No. 16/740,154, Non-Final Office Action dated May 6, 2022, 24 pp.
U.S. Appl. No. 16/696,810, Non-Final Office Action dated Jun. 27, 2022, 11 pp.
U.S. Appl. No. 17/673,535, Notice of Allowance dated Jul. 26, 2022, 11 pp.
U.S. Appl. No. 17/786,417, Non-Final Office Action dated Dec. 20, 2023, 29 pp.

* cited by examiner

SYSTEMS AND METHODS FOR ACTIVE CONTROL OF SURFACE DRAG USING ELECTRODES

CROSS-REFERENCE TO RELATED PATENT APPLICATION

This application claims the benefit of and priority to U.S. Provisional Patent Application No. 62/965,074, filed Jan. 23, 2020, the entire disclosure of which is incorporated by reference herein.

BACKGROUND

The present disclosure relates generally to the field of fluid flow over surfaces. More particularly, the present disclosure relates to systems and methods for active control of surface drag.

Surface drag is a force that acts opposite to the relative motion of an object moving through a fluid. Various material bodies in contact with a moving fluid, including but not limited to air, water, and ground transportation platforms, rotating or translating blades moving through air or water, and fluids transported through pipes and channels, experience some measure of surface drag, which can lead to slower speeds and less fuel efficiency.

SUMMARY

At least one aspect of the present disclosure relates to a fluid control system, according to some embodiments. In some embodiments, the fluid control system includes a dielectric-barrier discharge (DBD) device, and processing circuitry. The processing circuitry is configured to obtain a streamwise length scale of a fluid flowing over a surface, according to some embodiments. In some embodiments, the processing circuitry is also configured to obtain a convective time scale of the fluid flowing over the surface. In some embodiments, the processing circuitry is also configured to operate the DBD device, based on the streamwise length scale and the convective time scale, to provide momentum to the fluid flowing over the surface to adjust a flow property of the fluid.

In some embodiments, the property is at least one of a flow rate, a velocity, a momentum, a transverse momentum, a shear stress, a velocity profile, a velocity gradient, or a skin-friction coefficient of the fluid.

In some embodiments, the streamwise length scale and the convective time scale are parameters of a flow regime of the fluid flowing over the surface.

In some embodiments, the streamwise length scale has a value between $10\eta$ and $100,000\eta$, where $\eta$ is a viscous length scale of the flow regime of the fluid.

In some embodiments, the convective time scale has a value between $10\eta'$ and $10,000\eta'$, where $\eta'$ is a viscous time scale of the flow regime of the fluid.

In some embodiments, the DBD device is configured to provide spanwise bi-directional momentum to the fluid flowing over the surface.

In some embodiments, the DBD device includes multiple DBD electrodes.

In some embodiments, the processing circuitry is configured to sequentially activate the multiple DBD electrodes to provide the momentum in a spanwise direction to the fluid flowing over the surface.

In some embodiments, the multiple DBD electrodes each have a height less than a hydrodynamic height.

In some embodiments, the multiple DBD electrodes are arranged in an array extending along at least a spanwise direction, a streamwise direction, or a direction other than the spanwise direction or the streamwise direction.

In some embodiments, the multiple DBD electrodes have a length and a spatial frequency, the length and the spatial frequency of each of the multiple DBD electrodes varying based on a streamwise or spanwise position of each of the multiple DBD electrodes.

In some embodiments, the multiple DBD electrodes have a length and a spatial frequency, the length and the spatial frequency of each of the multiple DBD electrodes varying based on expected local flow conditions of the fluid flowing over the surface.

In some embodiments, the multiple DBD electrodes are sized to control eddy motions of the fluid flowing over the surface based on the streamwise length scale and the convective time scale.

In some embodiments, the processing circuitry is configured to operate the DBD device to provide the momentum to the fluid flowing over the surface by operating the DBD device according to a temporal frequency, the temporal frequency based on the convective time scale.

In some embodiments, the processing circuitry is configured to operate the DBD device to provide spanwise momentum to the fluid flowing over the surface, the spanwise momentum being between 1% and 20% of a freestream fluid momentum of the fluid flowing over the surface.

In some embodiments, the momentum reduces a skin-friction drag on the surface.

At least another aspect of the present disclosure relates to a method for controlling a property of a fluid that flows over a surface, according to some embodiments. In some embodiments, the method includes obtaining a streamwise length scale and a convective time scale of a flow regime of the fluid that flows over the surface at least partially based on a sensor input. In some embodiments, the method further includes determining an operation of a dielectric-barrier discharge (DBD) device based on the streamwise length scale and the convective time scale of the flow regime to control a flow property of the flow regime of the fluid. In some embodiments, the method includes operating the DBD device according to the determined operation to provide momentum to the flow regime of the fluid that flows over the surface to adjust the flow property of the flow regime of the fluid.

In some embodiments, the flow property is at least one of a flow rate, a velocity, a momentum, a transverse momentum, a shear stress, a velocity profile, a velocity gradient, or a skin-friction coefficient of the fluid.

In some embodiments, the streamwise length scale has a value between $10\eta$ and $100,000\eta$, where $\eta$ is a viscous length scale of the flow regime of the fluid.

In some embodiments, the convective time scale has a value between $10\eta'$ and $10,000\eta'$, where $\eta'$ is a viscous time scale of the flow regime of the fluid.

In some embodiments, the determined operation includes operating the DBD device to provide spanwise bi-directional momentum to the fluid flowing over the surface.

In some embodiments, the DBD device includes multiple DBD electrodes.

In some embodiments, the determined operation includes sequentially activating the plurality of DBD electrodes to provide the momentum in a spanwise direction to the fluid flowing over the surface.

In some embodiments, the multiple DBD electrodes each have a height less than a hydrodynamic height.

In some embodiments, the multiple DBD electrodes are arranged in an array extending along at least a spanwise direction, a streamwise direction, or a direction other than the spanwise direction or the streamwise direction.

In some embodiments, the multiple DBD electrodes have a length and a spatial frequency, the length and the spatial frequency of each of the multiple DBD electrodes varying based on a streamwise or spanwise position of each of the multiple DBD electrodes.

In some embodiments, the multiple DBD electrodes have a length and a spatial frequency, the length and the spatial frequency of each of the multiple DBD electrodes varying based on expected local flow conditions of the fluid flowing over the surface.

In some embodiments, the DBD electrodes are sized to control eddy motions of the fluid flowing over the surface based on the streamwise length scale and the convective time scale.

In some embodiments, the determined operation includes operating the DBD device to provide the momentum to the fluid flowing over the surface by operating the DBD device according to a temporal frequency, the temporal frequency based on the convective time scale.

In some embodiments, the determined operation includes operating the DBD device to provide spanwise momentum to the fluid flowing over the surface, the spanwise momentum being between 1% and 20% of a freestream fluid momentum of the fluid flowing over the surface.

In some embodiments, the momentum reduces a skin-friction drag on the surface.

At least another aspect of the present disclosure relates to a method for adjusting a property of a fluid that flows over a surface, according to some embodiments. The method includes obtaining a streamwise length scale of a flow regime of the fluid that flows over the surface, according to some embodiments. In some embodiments, the streamwise length scale is between $10\eta$ and $100,000\eta$, where $\eta$ is a viscous length scale of the flow regime of the fluid. In some embodiments, the method includes obtaining a convective time scale of the flow regime of the fluid that flows over the surface, wherein the convective time scale is between $10\eta'$ and $10,000\eta'$, where $\eta'$ is a viscous time scale of the flow regime of the fluid. In some embodiments, the method includes providing momentum to the fluid to adjust a flow property of the flow regime of the fluid based on the streamwise length scale and the convective time scale.

In some embodiments, the property is a flow rate of the fluid.

In some embodiments, providing the momentum to the fluid to adjust the property of the flow regime of the fluid includes operating a dielectric-barrier discharge (DBD) device, the DBD device including multiple DBD electrodes.

In some embodiments, the method includes operating the DBD device to provide spanwise bi-directional momentum to the fluid flowing over the surface.

In some embodiments, providing the momentum includes sequentially activating the multiple DBD electrodes to provide the momentum in a spanwise direction to the fluid flowing over the surface.

In some embodiments, the multiple DBD electrodes each have a height less than a hydrodynamic height.

In some embodiments, the multiple DBD electrodes are arranged in an array extending along at least a spanwise direction, a streamwise direction, or a direction other than the spanwise direction or the streamwise direction.

In some embodiments, the multiple DBD electrodes have a length and a spatial frequency, the length and the spatial frequency of each of the plurality of DBD electrodes varying based on a streamwise or spanwise position of each of the plurality of DBD electrodes.

In some embodiments, the multiple DBD electrodes have a length and a spatial frequency, the length and the spatial frequency of each of the multiple DBD electrodes varying based on expected local flow conditions of the fluid flowing over the surface.

In some embodiments, the multiple DBD electrodes are sized to control eddy motions of the fluid flowing over the surface based on the streamwise length scale and the convective time scale.

In some embodiments, providing the momentum to the fluid includes operating the DBD device to provide the momentum to the fluid flowing over the surface by operating the DBD device according to a temporal frequency, the temporal frequency based on the convective time scale.

In some embodiments, providing the momentum to the fluid includes operating the DBD device to provide spanwise momentum to the fluid flowing over the surface, the spanwise momentum being between 1% and 20% of a freestream fluid momentum of the fluid flowing over the surface.

In some embodiments, the momentum reduces a skin-friction drag on the surface.

At least another aspect of the present disclosure relates to a wind turbine, according to some embodiments. The wind turbine includes multiple turbine blades, a base, and a fluid control system, according to some embodiments. In some embodiments, the base is configured to support the turbine blades. In some embodiments, the turbine blades are configured to rotate relative to the base as a fluid flows across the turbine blades. In some embodiments, the fluid control system is positioned on at least one of the turbine blades. The fluid control system includes a dielectric-barrier discharge (DBD) device, and processing circuitry, according to some embodiments. In some embodiments, the processing circuitry is configured to obtain a streamwise length scale of the fluid, obtain a convective time scale of the fluid, and operate the DBD device, based on the streamwise length scale and the convective time scale, to adjust a flow property of the fluid.

In some embodiments, the property is at least one of a flow rate, a velocity, a momentum, a transverse momentum, a shear stress, a velocity profile, a velocity gradient, or a skin-friction coefficient of the fluid.

In some embodiments, adjusting the property of the fluid reduces a skin-friction drag on a surface of the wind turbine.

At least another aspect of the present disclosure relates to an aircraft, according to some embodiments. In some embodiments, the aircraft includes a fuselage, a component including at least one of a wing or a flight control surface coupled with the fuselage, and a fluid control system positioned on at least one of the fuselage or the component. In some embodiments, the fluid control system includes a dielectric-barrier discharge (DBD) device, and processing circuitry. In some embodiments, the processing circuitry is configured to obtain a streamwise length scale of a fluid flowing over the at least one of the fuselage or the component, obtain a convective time scale of the fluid, and operate the DBD device, based on the streamwise length scale and the convective time scale, to adjust a flow property of the fluid.

In some embodiments, the property is at least one of a flow rate, a velocity, a momentum, a transverse momentum, a shear stress, a velocity profile, a velocity gradient, or a skin-friction coefficient of the fluid.

In some embodiments, adjusting the property of the fluid reduces a skin-friction drag on a surface of the fuselage or the component the aircraft.

This summary is illustrative only and is not intended to be in any way limiting. Other aspects, inventive features, and advantages of the devices and/or processes described herein, as defined solely by the claims, will become apparent in the detailed description set forth herein, taken in conjunction with the accompanying figures, wherein like reference numerals refer to like elements.

DETAILED DESCRIPTION

Figure 1:
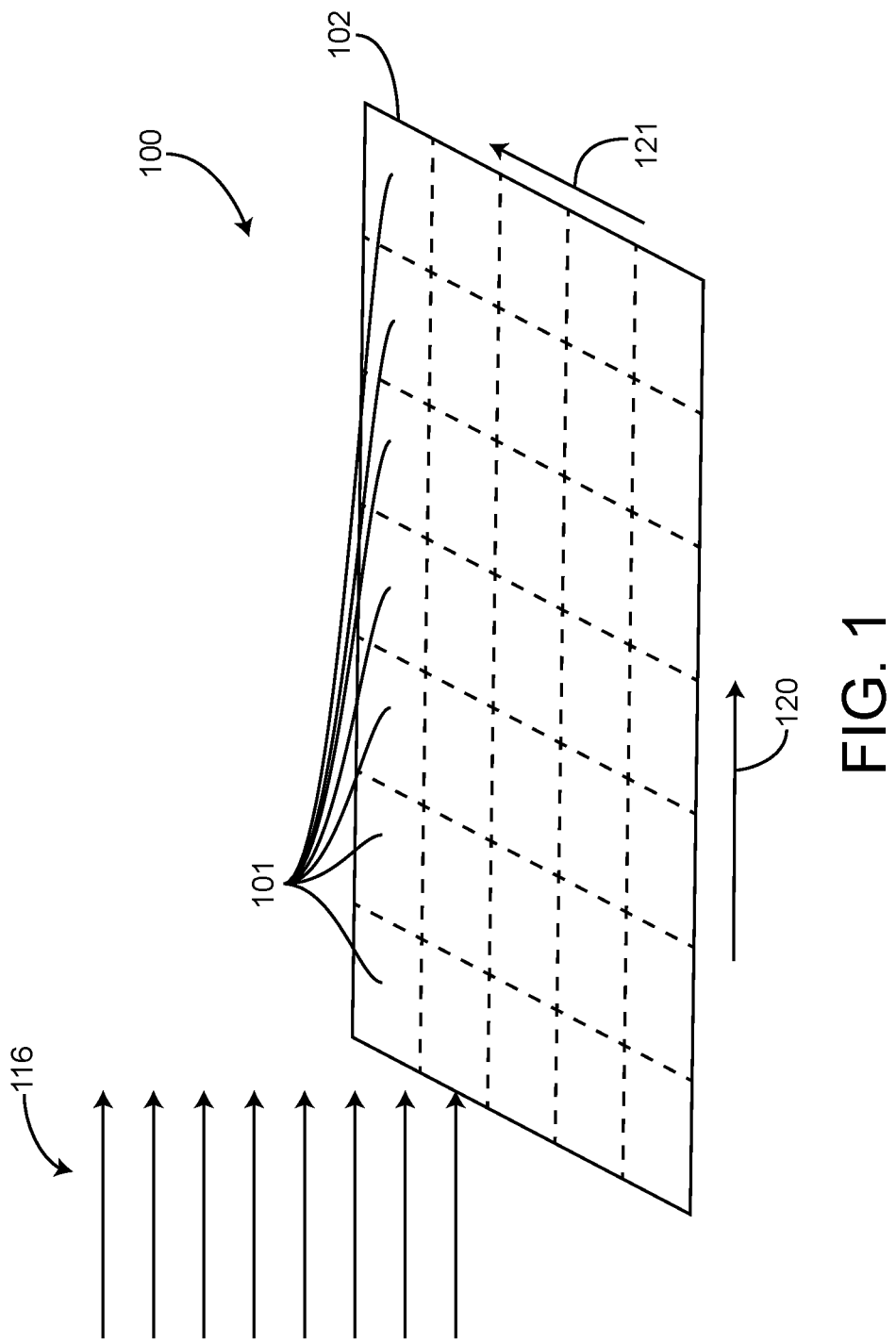
FIG. 1 is a diagram of a fluid control system for active adjustment of surface drag, according to an embodiment of the present disclosure.

Before turning to the figures, which illustrate the exemplary embodiments in detail, it should be understood that the present disclosure is not limited to the details or methodology set forth in the description or illustrated in the figures. It should also be understood that the terminology used herein is for the purpose of description only and should not be regarded as limiting.

System Overview

Referring generally to the figures, systems and methods described herein can be used to control drag on surfaces. Drag is a force acting opposite to the relative motion of any object moving with respect to a surrounding fluid. Drag manipulation technology has a wide range of applications for improving performance of systems that involve fluid flowing over a surface. For example, efficiency and speed can be increased in all manners of air transportation, including commercial aircraft, military aircraft, rockets, unmanned aerial vehicles, and general aviation. Reducing drag also increases efficiency in ground transportation such as in trains, cars, and tractor trailers. Water transportation, including maritime shipping, personal boating, and undersea transportation can similarly be benefited by reducing drag. Reducing drag can also boost efficiency when transporting fluids through pipes such as in natural gas or oil pipelines. Furthermore, power systems such as wind turbines are also limited in efficiency by drag on their working surfaces. Reducing drag on turbine blades and other surfaces can improve power generation efficiency, reduce operating costs and minimize environmental impacts. Manipulating drag can be valuable across a wide range of Reynolds numbers, including relatively high Reynolds numbers experienced by maritime shipping through water and the relatively low Reynolds numbers experienced by unmanned aerial vehicles. Selectively increasing drag can also be useful for braking, steering, and other control of bodies moving through the fluid, such as movable platforms (e.g., vehicles). Being able to actively control surface drag of an object allows for not only the minimization of surface drag when efficiency or speed is most needed, but it can also allow for better steering and braking capabilities through selectively increasing surface drag.

Air acts as a viscous fluid at sub-sonic speeds. An object moving through air may collect a group of air particles, which the object tends to pull along as the object moves. Air particles close to the surface of the object tend to move with approximately the same velocity as the object due to molecular adhesion. As a flat plate, airfoil, or other object moves through a free stream of air at a given relative velocity, molecular adhesion causes a boundary layer of air having relative velocities below that of the relative free stream velocity to form adjacent the object surface. The boundary layer can be a layer of air surrounding an object in which the relative velocity of the layer of molecules closest to the object is at or near zero, and in which the relative velocity at successively distant points from the object increases until it approaches that of the free stream, at which point the outer limit of the boundary layer is reached. For example, for an airfoil, the boundary layer can include the interface between the airfoil and the air mass surrounding the airfoil. The boundary layer may be relatively small as compared to a size dimension of the object. The difference between the free stream velocity and the relative velocities in the boundary layer region contribute to drag. Thus, increasing the relative velocities in the boundary layer region can reduce drag, and conversely, decreasing the relative velocities in the boundary layer region can increase drag. Drag may be caused by disturbances in flow, retarding flow near a surface. Such disturbances may not be damped as Reynolds number increases, which can lead to interactions that cause increasing disturbances, such as turbulent eddies. Disturbances may flow away from the surface into the outer boundary layer, which can cause continued disturbances. The present solution can control surface drag by controlling the difference between the velocity of the free stream and the relative velocities of the boundary layer, such as by interrupting the generation of disturbances near the surface.

Turbulent flow in boundary layers can contribute towards drag. A turbulent boundary layer can have a large number of eddies that transfer momentum from the faster moving outer portions of the boundary layer to the relatively slower portions closer to the surface. As such, turbulent boundary layers may have more surface friction than laminar boundary layers, which have more smooth flows, and are generally free from these eddies. Making the boundary layer less turbulent can be used to decrease drag, and conversely making the boundary layer more turbulent can be used to increase drag.

Both spanwise (or transverse) and streamwise motion, or some combination of the two, can affect the drag by disrupting eddies by injecting additional momentum to the fluid. For example, this can be achieved by producing one or more surface waves (mechanical waves that propagate along the interface between the deformable surface and the fluid) that can manipulate the boundary layer in one or more directions. The surface waves can be simple surface waves such as sinusoidal waves or may be any other type of waves, including but not limited to superposition of sinusoids. Further, the waveform of the surface waves may be aperiodic or damped, or may comprise numerous surface displacements or deformations. Any of a variety of signal processing and analysis techniques may be applied in order to generate the desired waveforms, including but not limited to Fourier transforms, fast Fourier transforms (FFTs), wavelet transforms, and the like.

Any combination of spanwise (or transverse) or streamwise momentum (or momentum in any other direction) may be provided to or imparted to the fluid directly using actuators such as dielectric-barrier discharge devices (DBDs) fixedly coupled (e.g., mounted) above, on (e.g., flush, sub-flush, protruding, etc.), or beneath the surface. The DBDs do not move the surface directly but impact momentum to the fluid by creating electrical, chemical, and/or thermal gradients in the fluid which creates a plasma. The plasma may include any of, or any combination of, charged fluid particles, neutral fluid particles, or chemical species formed by a reaction of fluid molecules with the electric field and/or related thermal gradients. The plasma can interact with the fluid, which in turn accelerates fluid molecules in a region above the surface. The plasma may be formed in a direction that is, generally, between a high-voltage electrode and a ground electrode of one of the DBDs.

Although many of the concepts disclosed herein may be described with reference to air as being the fluid medium, the present solution can enable active control of surface drag of any of a variety of fluids.

A fluid control system can include a surface over which a fluid flows. The fluid control system may also include a controller and a sensor configured to measure a parameter of the fluid flowing over the surface. The fluid control system can also include one or more electrode devices that are positioned about the surface. The DBD devices can each include one or more high-voltage electrodes and one or more ground electrodes. The controller can operate the DBD devices so that an electric current or an electric field is passed through the fluid from the high-voltage electrode to a corresponding one of the ground electrodes. It should be understood that the term "fluid" as described herein may include any of, or any combination or co-mingling of a gas, a liquid, a plasma (e.g., the plasma formed by the systems and methods described herein), or various solid matter suspended in the fluid (e.g., particulate matter, particles, molecules, etc.). As discussed above, passing the electric current through the fluid may control a parameter of the fluid, such as a velocity or temperature of the fluid.

Figure 2:
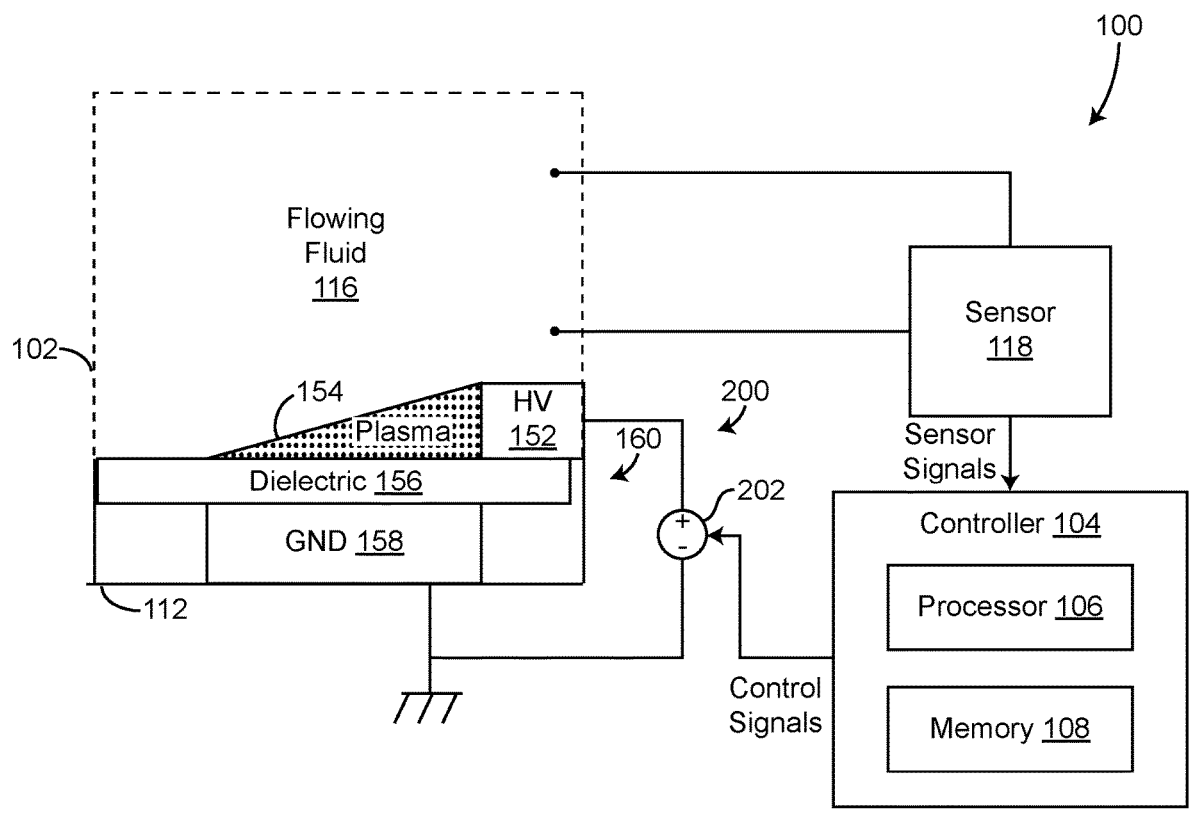
FIG. 2 is a block diagram of a fluid control system for active adjustment of surface drag, according to an embodiment of the present disclosure.

Referring to FIGS. 1 and 2, a fluid control system 100 can include an actuator, shown as DBD device 160, coupled to a surface 102 over which a fluid 116 (e.g., air, a liquid, a gas, a plasma, or any combination thereof, etc.) flows. The DBD device 160 can form a portion of the surface 102 that interacts with the fluid 116. The DBD device 160 can be disposed in a body 112 defining the surface 102. In some embodiments, the DBD device 160 is coupled to a bulk material (e.g., the body 112), and can be energized electrically.

Fluid 116 may define a streamwise direction 120 along a first axis (e.g., a longitudinal direction), and a spanwise direction 121 that is orthogonal to streamwise direction 120. Surface 102 can include multiple adjustable sections 101 that are arranged in an array. Fluid 116 may flow across surface 102 in streamwise direction 120 as shown in FIG. 1 (and into the page of FIG. 2).

The fluid control system 100 includes a controller 104. The controller 104 can include a processor 106 and memory 108. The processor 106 can be a general purpose or specific purpose processor, an application specific integrated circuit (ASIC), one or more field programmable gate arrays (FPGAs), a group of processing components, or other suitable processing components. The processor 106 is configured to execute computer code or instructions stored in memory 108 or received from other computer readable media (e.g., CDROM, network storage, a remote server, etc.). Memory 108 can include one or more devices (e.g., memory units, memory devices, storage devices, etc.) for storing data and/or computer code for completing and/or facilitating the various processes described in the present disclosure. Memory 108 can include random access memory (RAM), read-only memory (ROM), hard drive storage, temporary storage, non-volatile memory, flash memory, optical memory, or any other suitable memory for storing software objects and/or computer instructions. Memory 108 can include database components, object code components, script components, or any other type of information structure for supporting the various activities and information structures described in the present disclosure. Memory 108 can be communicably connected to processor 106 via controller 104 and may include computer code for executing (e.g., by processor 106) one or more processes described herein. When processor 106 executes instructions stored in memory 108, processor 106 generally configures the controller 104 to complete such activities.

As shown in FIG. 1, the DBD device 160 may include a high-voltage electrode and a low-voltage electrode, shown as ground electrode 158. A voltage source 202 (e.g., a battery, an energy storage device, etc.) can be electrically coupled with both the high-voltage electrode 152 and the ground electrode 158. The voltage source 202 can provide a voltage between the high-voltage electrode 152 and the ground electrode 158 to cause an electrical and/or thermal field to be produced between the high-voltage electrode 152 and the ground electrode 158. A portion or area of the fluid 116 between the high-voltage electrode 152 and the ground electrode 158 can function as a dielectric barrier 156. The electrical and/or thermal field between the high-voltage electrode 152 and the ground electrode 158 can produce a plasma 154. The plasma 154 can include any of, or any combination of, charged particles of the fluid 116, neutral particles of the fluid 116, or chemical species formed by a reaction of molecules of the fluid 116 with the electric field between the high-voltage electrode 152 and the ground electrode 158, and/or a related thermal gradient. The plasma can interact with the fluid 116, which in turn accelerates molecules of the fluid 116 above the surface 102, thereby providing momentum to the fluid 116 in a desired direction. The voltage source 202, the high-voltage electrode 152, and the ground electrode 158 can form a circuit 200.

The controller 104 can generate a control signal to control operation of the DBD device 160, such as to cause activation of the DBD device 160 (e.g., operating the voltage source 202 to provide a voltage across the high-voltage electrode 152 and the ground electrode 158). The controller 104 can determine parameters of the control signal, such as frequency and amplitude, based a desired momentum input to the fluid 116. For example, the controller 104 can select a parameter of the control signal corresponding to an expected change in drag of the fluid 116 relative to the surface 102. The controller 104 can execute a wave function that maps parameter(s) of the control signal to parameters of resulting fluid velocity profiles using operation of the DBD device 160, and a drag function that maps the parameters of the resulting transverse surface waves to corresponding changes in drag of the fluid 116 flowing over the surface 102, and can execute the wave function and the drag function to select the parameter(s) of the control signal.

The controller 104 can control operation of the DBD device 160 to control one or more parameters of the DBD device 160, such as at least one of an amplitude, wavelength, or frequency of the momentum injection (e.g., amplitude A, wavelength k, w depicted in FIG. 1). For example, the controller 104 can control an amplitude, frequency, or intermittency of actuation of the DBD device 160 to control the one or more parameters of the surface. The controller 104 can control the one or more parameters of the momentum injection based on a parameter of the fluid 116. For example, the controller 104 can control operation of the DBD device 160 to achieve target values for the one or more parameters of the momentum injection based on a viscous length scale η and/or a viscous time scale η' of the fluid 116, where η is defined according to Equation 1 below and η' is defined according to Equation 2 below, where ν is the kinematic viscosity of the fluid 116, $\tau_w$ is the wall shear stress of the fluid 116 relative to the surface 102, and ρ is the density of the fluid:

$$\eta = \frac{\nu}{\sqrt{\frac{\tau_w}{\rho}}} \quad \text{(Equation 1)}$$

$$\eta' = \frac{\nu}{\frac{\tau_w}{\rho}} \quad \text{(Equation 2)}$$

The controller 104 can also determine a value of a streamwise length scale using the viscous length scale η. The streamwise length scale may have a value approximately equal to or between 10η and 100,000η, where η is the viscous length scale of a flow regime of the fluid 116. The controller 104 can also determine a convective time scale of the fluid 116 based on the viscous time scale. The convective time scale can have a value approximately equal to or between 10η' and 100,000η', where η' is a viscous time scale of a flow regime of the fluid 116.

Fluid control system 100 can include a sensor 118. Sensor 118 can be configured to measure a parameter of fluid 116 (e.g., friction velocity, surface shear stress, viscosity, pressure, temperature, or other parameters indicative of turbulence or drag, the viscous length scale η as shown above) or may be configured to measure one or more values of different parameters (e.g., kinematic viscosity, wall shear stress, density, temperature, etc.) that can be used (e.g., by controller 104) to calculate the parameter of fluid 116. Sensor 118 provides the measure parameter(s) to controller 104. The sensor 118 can be configured to obtain sensor data upstream or downstream of a control surface or an array of control surfaces where one or more DBD devices 160 are positioned, or in between elements of an array of DBD devices 160. Generally, the sensor 118 may be located upstream, downstream, or in a same region as the DBD device 160. The sensor 118 can be provide sensor values to the controller 104 for use in determining the viscous length scale η using Equation 1 shown above or the viscous time scale η' using Equation 2 shown above, the streamwise length scale, the convective time scale of the fluid 116 or of the flow regime of the fluid.

Controller 104 can use the measured parameters to generate control signals for DBD device 160. DBD device 160 is operably coupled with surface 102 so that operation of DBD device 160 controls, adjusts, increases, modulates, etc., the parameter measured by sensor 118, or a different property or parameter of the fluid 120. For example, the property that the operation of the DBD device 160 adjusts may be any of a flow rate, a velocity, a momentum, a transverse momentum, a shear stress, a velocity profile, a velocity gradient, or a skin-friction coefficient of the fluid 120. Operation of DBD device 160 may adjust, modulate, change, etc., one or more parameters of the DBD device 160 to control or adjust the parameter of surface 102 that is measured by sensor 118. Operation of DBD device 160 may adjust various surface parameters of surface 102, thereby controlling fluid 116 and reducing drag of fluid 116 across surface 102 (e.g., reducing surface shear stress).

DBD device 160 may be configured to translate, move, adjust a position of, etc., one or more sections of surface 102. For example, sections 101 may be movable, deformable, or otherwise adjustable sections. In another embodiment, any of sections 101 include dielectric-barrier discharge (DBD) electrodes that may be operated by controller 104 to control the parameter of fluid 116 (e.g., to reduce drag or surface shear stress of surface 102).

Fluid control system 100 may operate in a closed-loop manner using sensor signals or real-time values of the parameter as obtained by or calculated based on sensor 118. Controller 104 can use the sensor signals or the real-time values of the parameter of fluid 116 in real-time to determine adjustments for surface 102 (e.g., to determine control signals for DBD device 160) to control the parameter of fluid 116 as desired or to achieve a desired value of the parameter of fluid 116 (e.g., to reduce drag of surface 102).

Drag Reduction Using Electrodes

Figure 4:
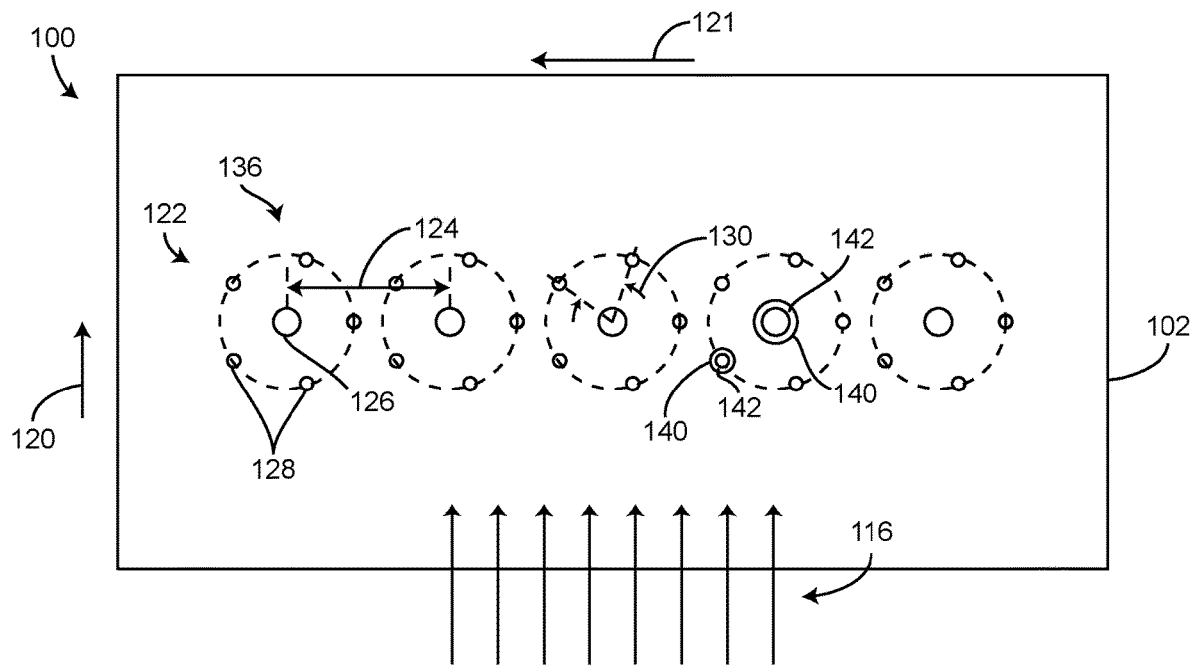
FIG. 4 is a top view of a surface of the fluid control system including multiple protrusions and radially spaced electrodes, according to an embodiment of the present disclosure.
Figure 5:
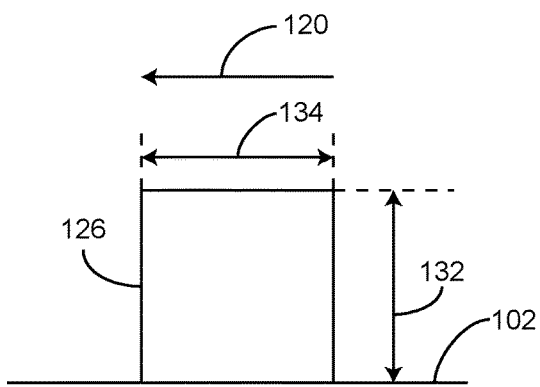
FIG. 5 is a side view of one of the multiple protrusions extending from the surface, according to an embodiment of the present disclosure.

Referring generally to FIGS. 4-5, DBD device 160 may be, include, or be implemented as an array 122 of DBD devices 136 that are configured to control the flow of fluid 116 over surface 102. The DBD devices 136 can be the same as or similar to the DBD device 160 as described in greater detail above with reference to FIG. 2. Array 122 may extend in at least one direction along surface 102. For example, array 122 may extend in spanwise direction 121 and/or streamwise direction 120. In one embodiment, array 122 is a one-dimensional array that extends along spanwise direction 121 as shown in FIG. 4. In another embodiment, array 122 is a two-dimensional array that extends along both spanwise direction 121 and streamwise direction 120. In another embodiment, array 122 is a one-dimensional array that extends in streamwise direction 120.

Array 122 can include multiple protrusions, extensions, fingers, structures, ribs, ridges, etc., that function as electrodes (e.g., the high-voltage electrode 152 or the ground electrode 158 of the DBD device 136), shown as protrusions 126 and 128. Protrusions 126 and 128 may have a cross-sectional shape of a circle, a square, a rectangle, etc. For example, protrusions 126 and 128 may be strips that extend from surface 102. For purposes of the following explanation, the protrusions 126 will be considered the "high-voltage" electrode (e.g., the high-voltage electrode 152) and one or more of the protrusions 128 will be considered as "ground" electrodes (e.g., the ground electrode 158). However, it should be understood, that any pair of the protrusions 126 and 128 could be used for the high-voltage electrode and the ground electrode, respectively.

Figure 6:
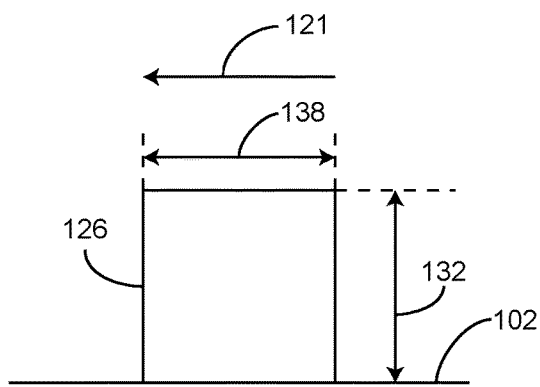
FIG. 6 is a side view of one of the multiple protrusions extending from the surface, according to an embodiment of the present disclosure.

As shown in FIGS. 5 and 6, protrusions 126 and/or 128 may have a height 132 relative to surface 102. In some embodiments, protrusions 126 and/or 128 have a width 134 along streamwise direction 120 (shown in FIG. 5) and a width 138 along spanwise direction 121 (shown in FIG. 6). Width 134 and width 138 can be substantially equal to each other (e.g., if protrusions 126 or 128 have a circular-shape or if protrusions 126 or 128 have a square-shape), or may be unequal (e.g., protrusions 126 and/or 128 may extend in streamwise direction 120 a greater distance than they extend in spanwise direction 121 or vice versa). In other embodiments, protrusions 126 and/or 128 are arranged as sheets or other structures that extend from surface 102. DBD devices 136 may be spaced apart a distance 124 from each other along a single row of array 122. In some embodiments, distance 124 is uniform between neighboring or proximate protrusions 126. In other embodiments, distance 124 is non-uniform between protrusions 126. For example, some of protrusions 126 may be spaced closer together than other protrusions 126. Additional rows of protrusions 126, DBD devices 136, or electrodes 128 (described in greater detail below) may be uniformly spaced apart, or may be non-uniformly spaced apart. For example, array 122 may include a first row that extends along spanwise direction 121 and additional rows that extend along streamwise direction 120, which may be uniformly or non-uniformly spaced.

DBD devices 136 may each be or function as dielectric barrier discharge (DBD) electrodes in conjunction with the fluid 116. For example, DBD devices 136 can each include multiple electrodes 128. Electrodes 128 may be flush with surface 102, sub-flush with surface 102, or protrude a distance from surface 102 into the flow of fluid 116. Electrodes 128 can be arranged according to array 122. For example, electrodes 128 may be spaced along array 122, similarly to or in place of protrusions 126. Similarly to protrusions 126, electrodes 128 may be spaced along array 122 in at least one direction (e.g., along streamwise direction 120 or along spanwise direction 121). Electrodes 128 may be radially spaced at uniform angular intervals 130. In one embodiment, electrodes 128 are radially spaced and centered at a corresponding protrusion 126 (shown in FIG. 4). For example, each DBD device 136 may include protrusion 126 and electrodes 128 radially spaced or surrounding protrusion 126. Electrodes 126 and 128 may function with fluid 116 as DBD electrodes. For example, electrodes 126 may be operated by controller 104 to introduce a current, an electric charge, an electric field, etc., that propagates through fluid 116 to electrodes 128, thereby producing a plasma between the electrodes 126 and 128 and providing momentum to the fluid 116. In some embodiments, one or more of electrodes 128 are high-voltage electrodes, while other electrodes 128 are ground electrodes. In other embodiments, electrodes 128 are high-voltage electrodes and protrusion 126 functions as a ground electrode. In some embodiments, electrodes 128 are covered with a dielectric barrier material and can be covered with a dielectric sheet. The surface 102 can include one or more indentations 142 within which the protrusions 126 (e.g., high-voltage electrodes) or the electrodes 128 (e.g., ground electrodes) are positioned. The surface 102 can also include one or more protrusions, sidewalls, riblets, etc., shown as riblets 140 that extend from the surface 102 and surround or partially surround any of the protrusions 126 and/or the electrodes 128.

In aerodynamic and/or other applications, the height 132 of the protrusions 126 and/or 128 may create a significant (e.g., non-negligible) amount of drag themselves, minimizing benefit of the functionality of the DBD device 136. Therefore, it may be desirable to keep the height 132 of the protrusions 126 and/or 128 below a threshold of about five wall units, where a wall unit is defined Equation 2 below, where ν is the kinematic viscosity of the fluid 116, $u_\tau$ is a friction velocity of the fluid 116 relative to the surface 102, and y is a distance from the wall:

$$y^+ = \frac{u_\tau \cdot y}{\nu} \qquad \text{(Equation 3)}$$

according to some embodiments. In some embodiments, the value of the wall unit $y^+$ may vary with flow speed of the fluid 116 and other parameters. In some embodiments, the height 132 of the protrusions is less than a hydrodynamic height.

By way of example, as the current or the electric field is discharged from electrodes 126 to a ground-electrode 128, the current may pass through the fluid 116 and control a parameter of the fluid, such as the velocity. For example, the current or the electric field may pass between a high-voltage electrode (e.g., the protrusion 126) to a ground electrode 128 in the spanwise direction 121, to control drag between the surface 102 and the fluid 116 by moving or controlling the velocity of the fluid 116 in the spanwise direction 121. Advantageously, using DBD devices 136 may control fluid 116 similarly to deforming surface 102 or changing a topology or geometry of surface 102 (e.g., in the spanwise direction 121) but without requiring physical changes to surface 102 (e.g., without requiring movable or deformable sections of surface 102).

In other embodiments, protrusions 126 or 128, or DBD devices 136 are spaced apart on surface 102 along a curved path, an irregular path, etc. It should be understood that the arrangement and configuration of protrusions 126, electrodes 128, or DBD devices 136 as shown in FIGS. 4-6 is illustrative only and is not intended to be limiting.

Electrodes 128 can be controlled or operated to discharge the electric current or the electric field by controller 104. In some embodiments, electrodes 128 may react to local changes in flow of fluid 116. Controller 104 may operate electrodes 128 to discharge electric current to control a parameter of fluid 116 or to reduce the drag or surface shear stress between surface 102 and controller 104.

Figure 7:
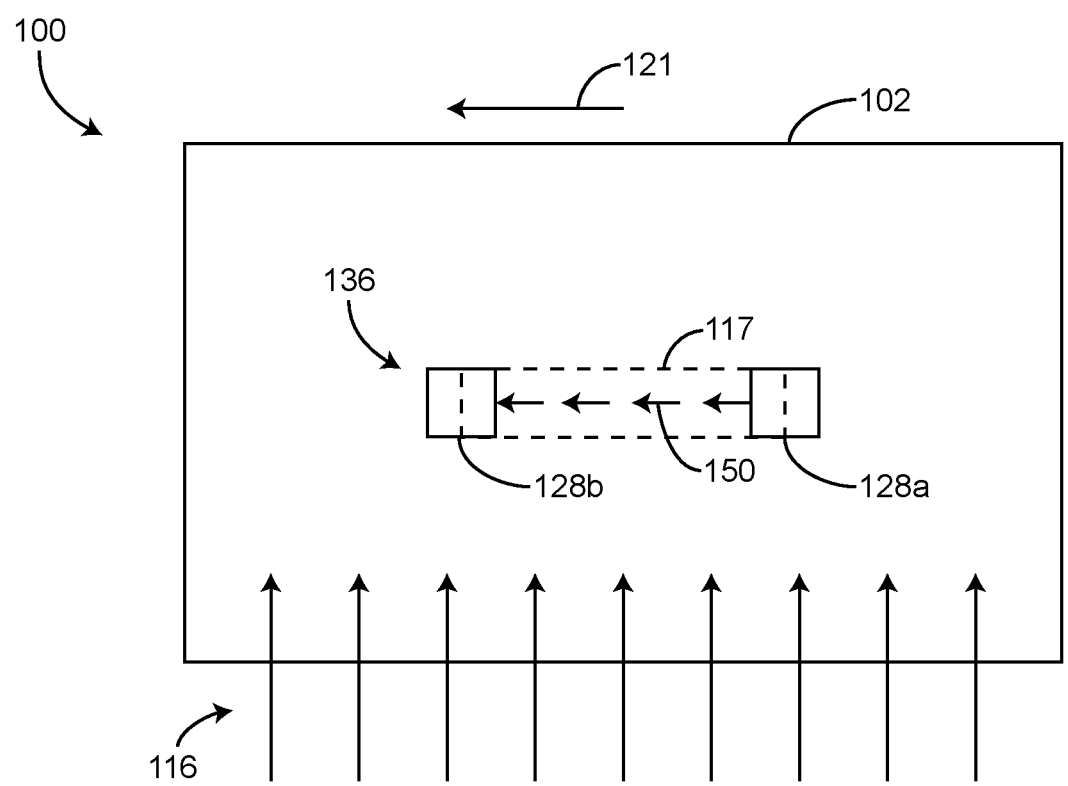
FIG. 7 is a diagram of one of the electrode devices, according to an embodiment of the present disclosure.

Referring particularly to FIG. 7, the DBD device 136 may include a high-voltage electrode 128a and a ground electrode 128b. The high-voltage electrode 128a can receive a voltage value or electrical energy from controller 104. In some embodiments, the high-voltage electrode 128a receives or draws electrical energy from an energy storage device. The high-voltage electrode 128a can discharge an electric current 150 (e.g., an electric field) to the ground electrode 128b (or vice versa). For example, the high-voltage electrode 128a may discharge electric current 150 to the ground electrode 128b in or along spanwise direction 121 to control a drag between fluid 116 and surface 102. The electric current 150 may be discharged through a portion 117 of fluid 116 that is between the high-voltage electrode 128a and the ground electrode 128b. Discharging the electric current 150 through the portion 117 of fluid 116 may control the parameter of the fluid 116. For example, discharging the electric current 150 through the portion 117 of fluid 116 may change or control various flow parameters of fluid 116.

Figure 8:
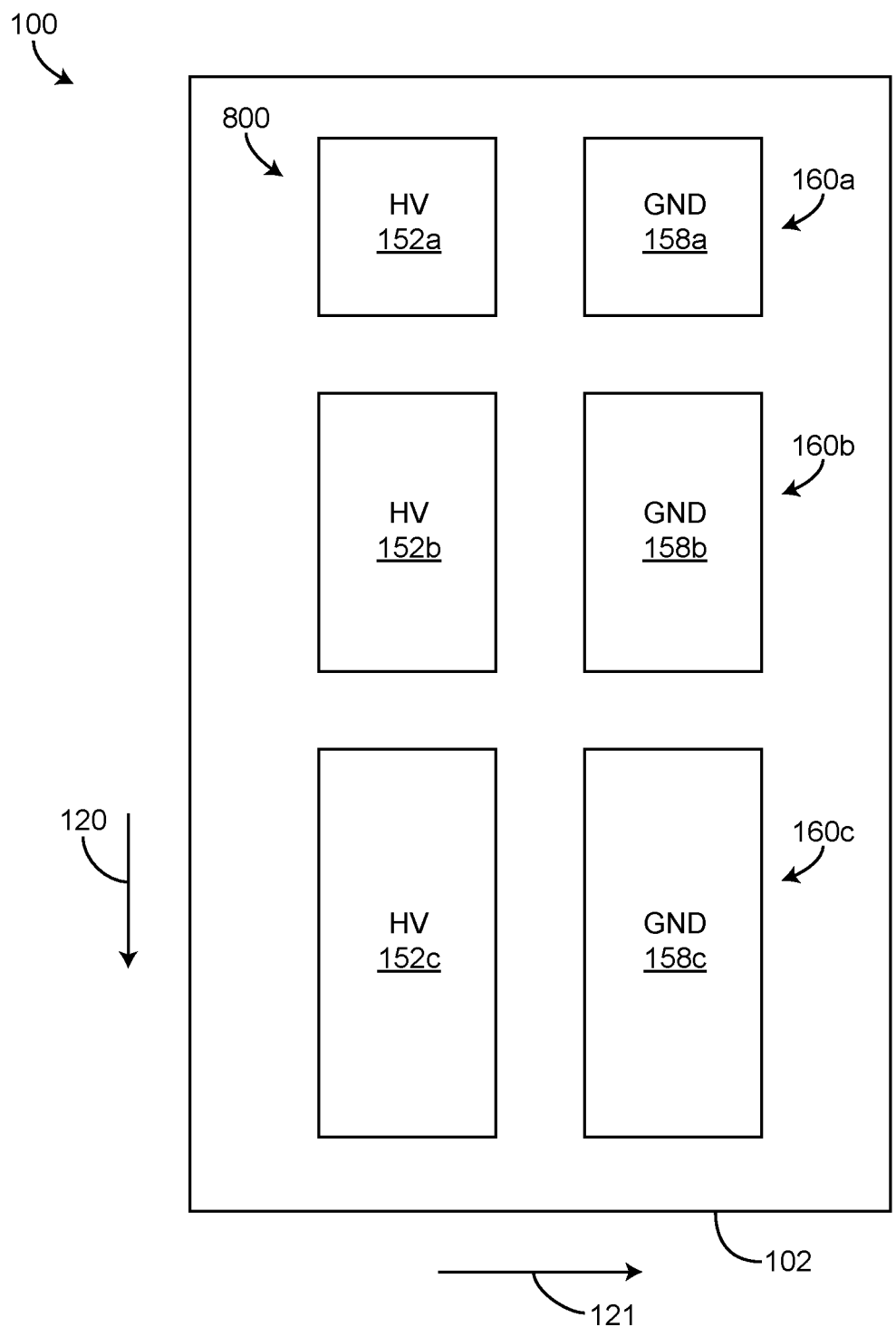
FIG. 8 is a diagram of an array of electrode devices for injecting momentum in a spanwise direction to a fluid flowing over a surface, according to an embodiment of the present disclosure.
Figure 9:
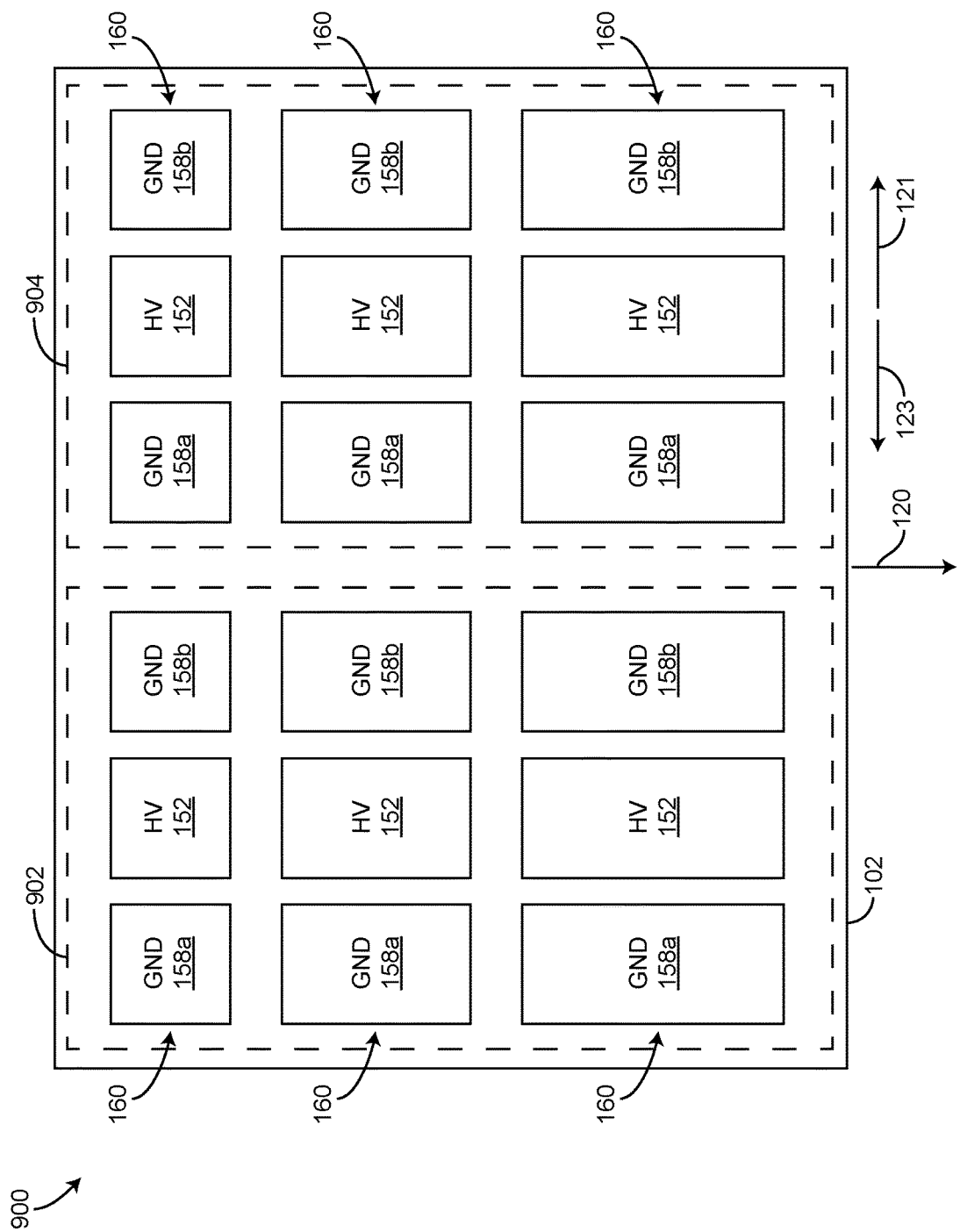
FIG. 9 is a diagram of a set of arrays of electrode devices for injecting momentum in either of multiple spanwise directions to a fluid flowing over a surface, according to an embodiment of the present disclosure.
Figure 10:
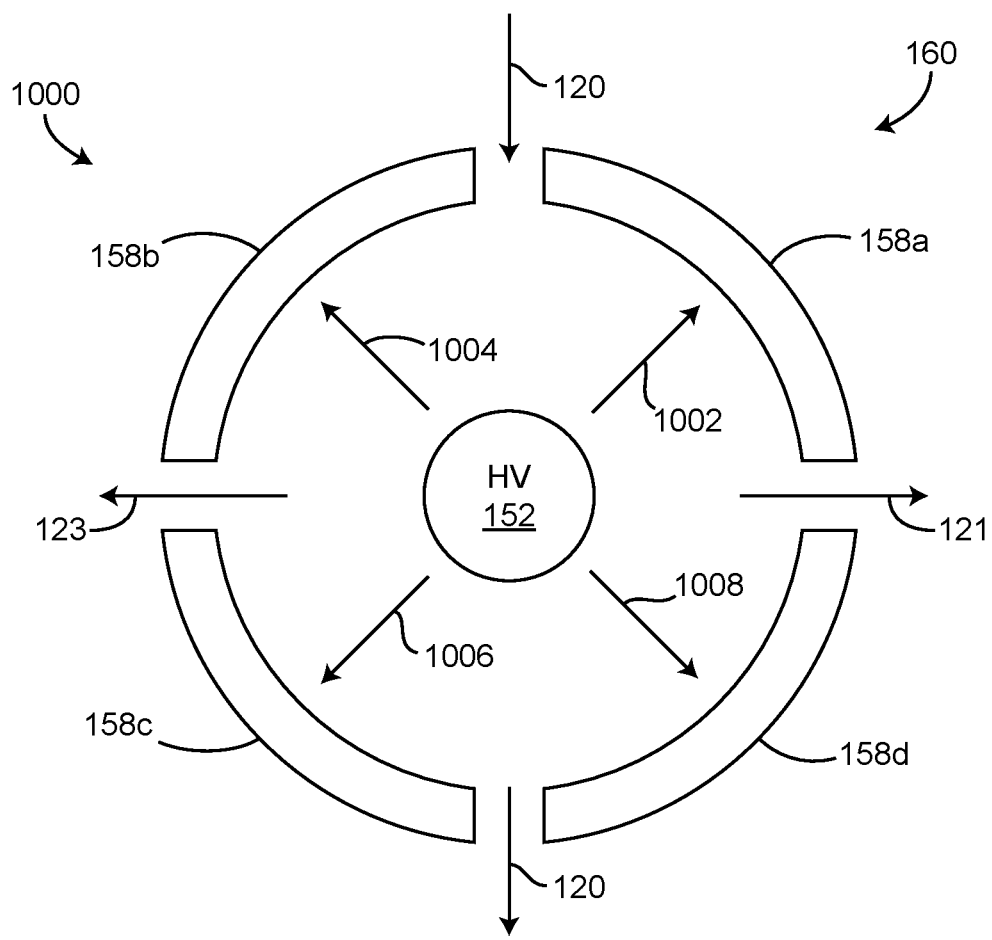
FIG. 10 is a diagram of an electrode device including a high voltage electrode and angularly spaced ground electrodes for injecting momentum into a fluid flowing over a surface in any direction, according to an embodiment of the present disclosure.

Referring to FIGS. 8-10, the DBD device 160 (or the DBD device 136) may take on a number of specific configurations advantageous to controlling skin friction drag (e.g., reducing skin friction draft along the surface 102). In one embodiment (shown in FIG. 8), an array 800 of DBD devices 160 could be arranged in the streamwise direction 120 along the surface 102 so as to impart momentum transversely (e.g., in the spanwise direction 121) to the flow of the fluid 116. The DBD devices 160 may vary in length and spacing (e.g., spatial frequency) to optimally match local flow conditions or based on a streamwise or spanwise position of each of the DBD devices 160. The configuration shown in FIG. 8 may only allow electrical discharge in one direction, and therefore only allow momentum injection in the one direction only (e.g., the spanwise direction 121).

Referring particularly to FIG. 9, another configuration 900 of the DBD devices 160 is shown, according to some embodiments. The configuration 900 shown in FIG. 9 includes a first array 902 of DBD devices 160 and a second array 904 of DBD devices 160. Each DBD device 160 of the first array 902 and the second array 904 includes the high-voltage electrode 152, a first ground electrode 158a, and a second ground electrode 158b. The first ground electrode 158a and the second ground electrode 158b are positioned on opposite sides of the high-voltage electrode 152 (e.g., in a streamwise direction 121 and an opposite streamwise direction 123). Each DBD device 160 of the first array 902 or the second array 904 can be operated or activated to provide an electric field between the high-voltage electrode 152 and one of the first ground electrode 158a (e.g., to provide momentum to the fluid 116 in the opposite streamwise direction 123) or the second ground electrode 158b (e.g., to provide momentum to the fluid 116 in the streamwise direction 121) so that an electric field is formed between the high-voltage electrode 152 and one of the first ground electrode 158a or the second ground electrode 158b. In some embodiments, alternating spanwise momentum injection (through operation of the DBD device 160 of the first array 902 or the second array 904) may be advantageous for drag control.

During operation of the DBD devices 160 of the first array 902 and the second array 904, the first ground electrode 158a or the second ground electrode 158b can be alternately electrically connected to, and taken out of a corresponding circuit (e.g., the circuit 200) so that a voltage is alternately provided between the high-voltage electrode 152 and at least one of the first ground electrode 158a or the second ground electrode 158b. This causes momentum to alternately be provided to the fluid 116 in either the spanwise direction 121 or the opposite spanwise direction 123. It should be understood that each of the DBD devices 160 of the first array 902 and/or the second array 904 may be independently operated to provide the momentum in either the spanwise direction 121 or the opposite spanwise direction 123. In some embodiments, the DBD devices 160 of the first array 902 or the second array 904 are operated or activated sequentially or in any other desired order to maximize momentum injection to the fluid 116 (in either the spanwise direction 121 or the opposite spanwise direction 123) at multiple points on the surface 102.

Referring particularly to FIG. 10, another configuration 1000 of one of the DBD electrode devices 160 is shown, according to some embodiments. The configuration 1000 of the DBD electrode device 160 shown in FIG. 10 may be implemented in the arrangement shown in FIG. 9 (e.g., each of the DBD devices 160 shown in FIG. 9 may be replaced with the DBD device 160 shown in FIG. 10), the arrangement shown in FIG. 8, the arrangement shown in FIG. 4, the arrangement shown in FIG. 2, etc.

As shown in FIG. 10, the DBD device 160 can include the high-voltage electrode 152 and one or more ground electrodes 158a-158d that are positioned about the high-voltage electrode 152. As shown in FIG. 10, a first ground electrode 158a is positioned at a first angular orientation relative to the high-voltage electrode 152, a second ground electrode 158b is positioned at a second angular orientation relative to the high-voltage electrode 152, a third ground electrode 158c is positioned at a third angular orientation relative to the high-voltage electrode 152, and a fourth ground electrode 158d is positioned at a fourth angular orientation relative to the high-voltage electrode 152. The ground electrodes 158 can be selectably activated (e.g., through operation of the controller 104) so that the high-voltage electrode 152 and the activated one of the ground electrodes 158 produces an electrical field therebetween, thereby providing momentum to the fluid 116 in a direction between the high-voltage electrode 152 and the activated one of the ground electrodes 158. For example, operating the DBD device 160 so that a voltage is provided between the high-voltage electrode 152 and the first ground electrode 158a causes momentum to be provided to the fluid 116 in a direction 1002 that is non-orthogonal and non-parallel with the streamwise direction 120 (or correspondingly, non-orthogonal and non-parallel with the spanwise direction 121 and the opposite spanwise direction 123). Similarly, a voltage can be provided between any of the second ground electrode 158b, the third ground electrode 158c, or the fourth ground electrode 158d and the high-voltage electrode 152 to provide momentum to the fluid 116 in any of the second direction 1004, the third direction 1006, or the fourth direction 1008.

Any of, or multiple of the ground electrodes 158 can be selectively energized to inject momentum in any of the directions 1002-1008, simultaneously, in sequence, etc. In some embodiments, a polarity of the high-voltage electrode 152 and the ground electrodes 158 is reversed (e.g., the ground electrodes 158 are high-voltage electrodes and the high-voltage electrode 152 is a ground electrode). Multiple of the DBD device 160 as shown in FIG. 10 may be arranged in one or more arrays that extend in any direction along the surface 102 (e.g., in the streamwise direction 120, in either of the spanwise directions 121 and 123, in a non-spanwise direction, etc.). Such arrays can be operated to selectively direct or inject momentum across the surface 102 in various directions based on local flow fields, local flow conditions, desired effects on drag, or other flow parameters.

In this way, the configuration 1000 of the DBD device 160 shown in FIG. 10 can allow non-spanwise injection of momentum to the fluid 116, through the angular position of the ground electrodes 158 relative to a center of the high-voltage electrode 152. It should be understood that more than four ground electrodes 158 may be used, and that such ground electrodes can be positioned at any angular positions about the center of the high-voltage electrode 152 so that the DBD device 160 is configured to provide momentum injection in a variety of directions (e.g., non-spanwise directions, non-streamwise directions, etc.). Advantageously, the configuration 1000 of the DBD device 160 shown in FIG. 10 facilitates dynamically changing a direction in which the momentum is provided to the fluid 116 over various areas of the surface 102.

In some embodiments, a level of drag control depends on a frequency of the momentum injection that is provided to the fluid 116 by any of the DBD devices 160 or 136 as described herein. Spacing and/or frequency of the momentum injection (e.g., of the DBD device 160 or the DBD device 136) can be arranged to selectively energize eddies of a particular size and/or spacing using Equation 1 shown above. In this way, the sizing of the DBD devices 160 or 136 can be configured to control eddy motions of the fluid 116. The sizing of the DBD devices 160 or 136 can be based on the value of the streamwise length scale and/or the value of the convective time scale. Particular DBD devices 160 or 136 of an array can be selectively activated to energize various areas of the fluid 116 that flows over the surface 102, such as areas 101 as shown in FIG. 1 using Equation 1 and information from the sensor 118 shown in FIG. 2. The momentum injected to the fluid 116 by operation of the DBD devices 160 or the DBD devices 136 can be provided in a spanwise direction, with the momentum being between 1% and 20% of a freestream fluid momentum of the fluid 116 (e.g., as measured by the sensor 118).

Figure 3:
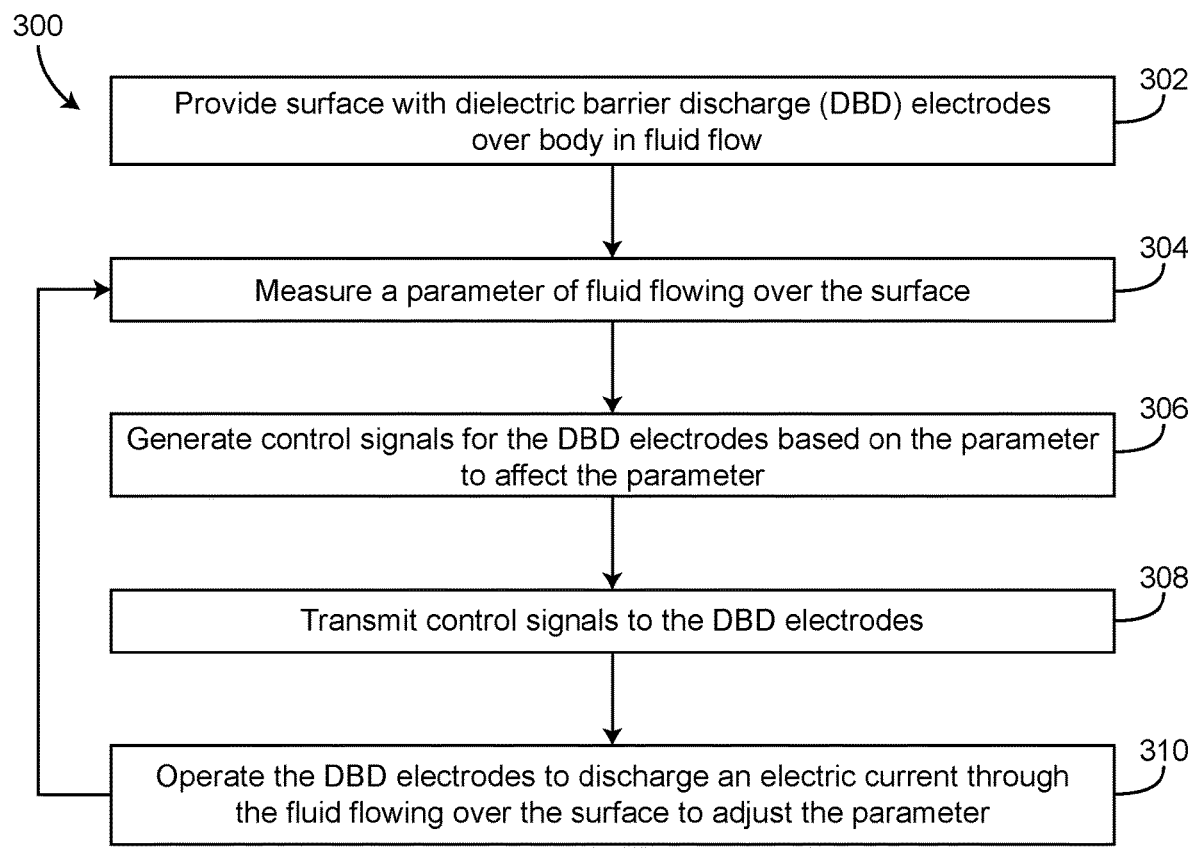
FIG. 3 is a flow diagram of a method for active control of surface drag, according to an embodiment of the present disclosure.

Referring particularly to FIG. 3, a flow diagram of a process 300 for controlling a parameter of a flowing fluid over a surface is shown, according to some embodiments. Process 300 includes steps 302-310 and may be performed by fluid control system 100 using DBD devices 136. Process 300 can be performed by fluid control system 100 to control a parameter of fluid 116 or to reduce a drag or surface shear stress of surface 102. Process 300 may include controlling DBD devices 136 to discharge an electric current into the fluid 116 to control the parameter of fluid 116 that flows over surface 102 or to reduce drag of surface shear stress of surface 102.

Process 300 includes providing a surface with DBD electrodes over a body in fluid flow (step 302), according to some embodiments. The surface may be surface 102 and can include multiple DBD electrodes implemented as DBD devices 136, electrodes 128, protrusions 126, etc., which can be configured to discharge an electric current into a fluid to control a parameter of the fluid that flows over the surface. The DBD electrodes may be arranged across the surface as an array (e.g., a one-dimensional array, a two-dimensional array, etc.) or radially spaced. In some embodiments, the DBD electrodes are arranged or spaced apart along a spanwise extending path. For example, the DBD electrodes may be configured to emit or discharge an electric current into the fluid flowing over the surface in a spanwise direction that is perpendicular to a streamwise direction of the fluid.

Process 300 includes measuring a parameter of fluid flowing over the surface (step 304), according to some embodiments. The parameter may be any fluid property of the fluid that flows over the surface. For example, the parameter may indicate an amount of drag or surface shear stress between the surface and the fluid flowing over the surface. In some embodiments, the parameter of fluid flowing over the surface is measured by sensor 118. Sensor 118 may measure the parameter or property of the fluid directly and provide the measured parameter to controller 104. In other embodiments, sensor 118 measures one or more properties of the fluid that flows over the surface which can be used by controller 104 to calculate the parameter of the fluid.

Process 300 includes generating control signals for the DBD electrodes based on the parameter to control the parameter (step 306), according to some embodiments. Step 306 may include using the parameter to determine which of DBD electrodes should be activated or deactivated to control the parameter as desired. The control signals may include a voltage value for one of the high-voltage electrodes of the DBD electrodes, or may be multiple voltage values for several of the high-voltage electrodes. Step 306 can be performed by controller 104. The DBD electrodes may be independently controlled by controller 104.

Process 300 includes transmitting the control signals to the DBD electrodes (step 308), according to some embodiments. Transmitting the control signals to the DBD electrodes may include providing the signals using a wired or wireless connection between the controller 104 and the DBD devices 136. Providing the control signals to the DBD electrodes may transition the electrodes between an activated state, when the DBD electrode operates to provide the electric current through the fluid flowing over the surface, and a deactivated state, when the DBD electrode does not operate to provide the electric current to the fluid flowing over the surface. Step 308 may be performed by controller 104. Controller 104 can operate the DBD electrodes (e.g., the DBD devices 160 and/or the DBD devices 136) according to a temporal frequency that is based on the value of the convective time scale.

Process 300 includes operating the DBD electrodes to discharge the electric current through the fluid flowing over the surface to adjust the parameter (step 310), according to some embodiments. Step 310 may include receiving the control signals at the DBD electrodes (e.g., at DBD device 160) and using the control signals to activate or deactivate the DBD electrodes to discharge the electric current through the fluid flowing over the surface. In some embodiments, step 310 includes adjusting a voltage value of one or more of the DBD electrodes.

Figure 11:
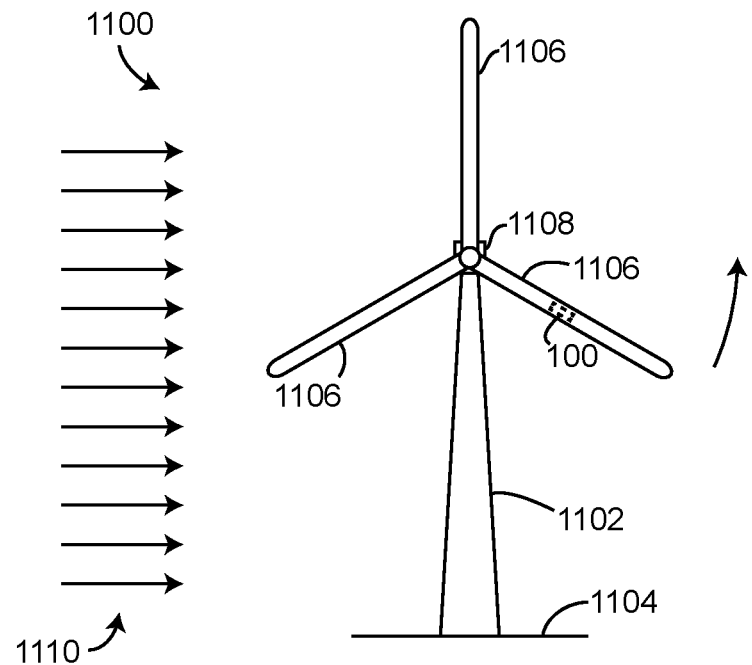
FIG. 11 is a diagram of a wind turbine in which the fluid control systems or method of FIGS. 1-10 can be implemented, according to some embodiments.
Figure 12:
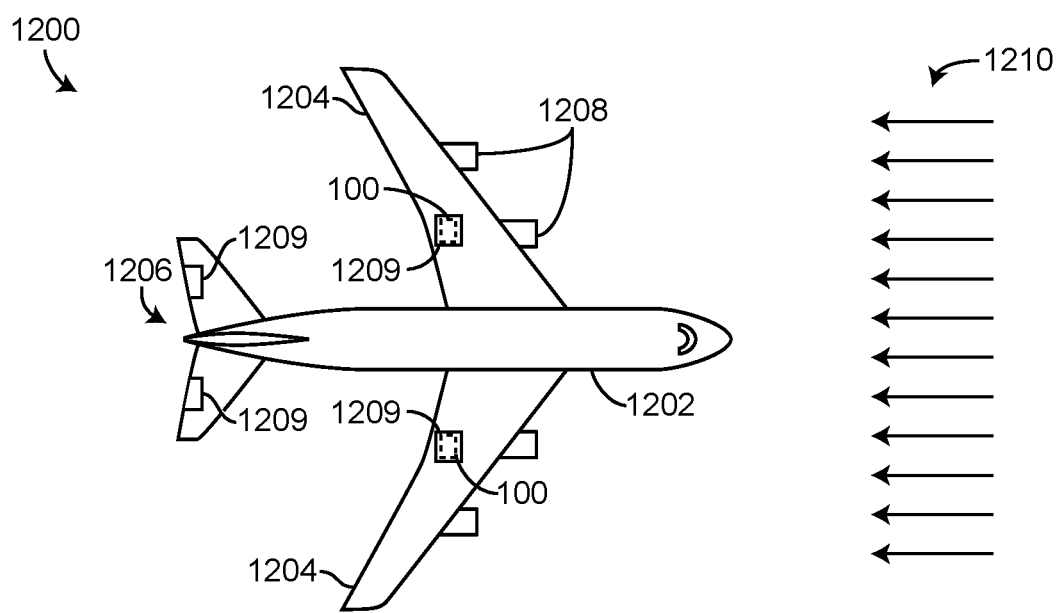
FIG. 12 is a diagram of an aircraft in which the fluid control systems or method of FIGS. 1-10 can be implemented, according to some embodiments.

Referring to FIGS. 11-12, various implementations of the fluid control system 100 are shown, according to exemplary embodiments. The fluid control system 100 can be implemented or used on a wind turbine 1100 or an aircraft 1200. For example, referring particularly to FIG. 11, the wind turbine 1100 can include a base 1102 that is anchored with a ground surface 1104, multiple turbine blades 1106, and a nacelle 1108. The wind turbine 1100 can also include a generator and can be configured to generate electricity from mechanical energy of the turbine blades 1106 as the turbine blades 1106 are driven by a wind 1110 (e.g., a fluid) to rotate relative to the nacelle 1108. The fluid control system 100 can be positioned along any of or multiple of the turbine blades 1106. The fluid control system 100 can implement the techniques described herein to facilitate improved rotation of the turbine blades 1106 relative to the nacelle 1108, thereby facilitating improved electricity generation.

Similarly, referring particularly to FIG. 12, the aircraft 1200 can be an airplane, a helicopter, a jet, etc. The aircraft 1200 may include one or more wings 1204, a fuselage 1202 from which the wings 1204 extend, tail stabilizers 1206, one or more flight control surfaces 1209 (e.g., rudders, ailerons, elevators, flaps) and multiple jet engines 1208. The wings 1204 can provide lift for the aircraft 1200 when air 1210 passes across the wings 1204. The fluid control system 100 can be positioned at a position along one or both of the wings 1204, or at multiple locations along both the wings 1204, or at multiple locations along one of the wings 1204. As the wings 1204 pass through the air 1210, the fluid control system 100 can operate to reduce drag, thereby improving efficiency of the aircraft 1200.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

The term "coupled," as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. Such members may be coupled mechanically, electrically, and/or fluidly.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X, Y, Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit and/or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the fluid control systems and methods of fluid control as shown in the various exemplary embodiments is illustrative only. Additionally, any element disclosed in one embodiment may be incorporated or utilized with any other embodiment disclosed herein. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. A fluid control system, comprising:
a dielectric-barrier discharge (DBD) device; and
processing circuitry configured to:
obtain a streamwise length scale of a flow regime of a fluid flowing over a surface, where the streamwise length scale is between 10η and 100,000η, where η is a viscous length scale of the flow regime of the fluid;
obtain a convective time scale of the flow regime of the fluid flowing over the surface, where the convective time scale is between 10η' and 10,000η', where η' is a viscous time scale of the flow regime of the fluid; and
operate the DBD device, based on the streamwise length scale and the convective time scale, to provide momentum in a spanwise direction to the fluid flowing over the surface to adjust a flow property of the fluid.

2. The fluid control system of claim 1, wherein the flow property is at least one of a flow rate, a velocity, a momentum, a transverse momentum, a shear stress, a velocity profile, a velocity gradient, or a skin-friction coefficient of the fluid.

3. The fluid control system of claim 1, wherein the DBD device is configured to provide spanwise bi-directional momentum to the fluid flowing over the surface.

4. The fluid control system of claim 1, wherein the DBD device comprises a plurality of DBD electrodes.

5. The fluid control system of claim 4, wherein the processing circuitry is configured to sequentially activate the plurality of DBD electrodes to provide the momentum in the spanwise direction to the fluid flowing over the surface.

6. The fluid control system of claim 4, wherein each of the plurality of DBD electrodes has a height less than a hydrodynamic height.

7. The fluid control system of claim 4, wherein the DBD electrodes are arranged in an array extending along at least the spanwise direction, a streamwise direction, or a direction other than the spanwise direction or the streamwise direction.

8. The fluid control system of claim 7, wherein each of the plurality of DBD electrodes has a length and a spatial frequency, the length and the spatial frequency of each of the plurality of DBD electrodes varying based on a position of each of the plurality of DBD electrodes.

9. The fluid control system of claim 7, wherein each of the plurality of DBD electrodes has a length and a spatial frequency, the length and the spatial frequency of each of the plurality of DBD electrodes varying based on expected local flow conditions of the fluid flowing over the surface and the spatial frequency being between 10 mm and 50 mm.

10. The fluid control system of claim 4, wherein the plurality of DBD electrodes are sized to control eddy motions of the fluid flowing over the surface based on the streamwise length scale and the convective time scale.

11. The fluid control system of claim 1, wherein the processing circuitry is configured to operate the DBD device to provide the momentum to the fluid flowing over the surface by operating the DBD device according to a temporal frequency, the temporal frequency based on the convective time scale.

12. The fluid control system of claim 1, wherein the processing circuitry is configured to operate the DBD device to provide spanwise momentum to the fluid flowing over the surface, the spanwise momentum being between 1% and 20% of a freestream fluid momentum of the fluid flowing over the surface.

13. The fluid control system of claim 1, wherein the surface comprises one or more riblets protruding from the surface, wherein the one or more riblets at least partially surround the DBD device.

14. The fluid control system of claim 1, wherein the momentum reduces a skin-friction drag on the surface.

15. A method for controlling a property of a fluid that flows over a surface, the method comprising:
obtaining a streamwise length scale and a convective time scale of a flow regime of the fluid that flows over the surface at least partially based on a sensor input, wherein the streamwise length scale is a function of a viscous length scale, η, of the flow regime of the fluid, and wherein the convective time scale is a function of a viscous time scale, η', of the flow regime of the fluid;
determining an operation of a dielectric-barrier discharge (DBD) device based on the streamwise length scale and the convective time scale of the flow regime to control a flow property of the flow regime of the fluid; and
operating the DBD device according to the determined operation to provide momentum in a spanwise direction to the flow regime of the fluid that flows over the surface to adjust the flow property of the flow regime of the fluid.

16. The method of claim 15, wherein the flow property is at least one of a flow rate, a velocity, a momentum, a transverse momentum, a shear stress, a velocity profile, a velocity gradient, or a skin-friction coefficient of the fluid.

17. The method of claim 15, wherein the streamwise length scale has a value between 10η and 100,000η.

18. The method of claim 15, wherein the convective time scale has a value between 10η' and 10,000η.

19. The method of claim 15, wherein the determined operation comprises operating the DBD device to provide spanwise bi-directional momentum to the fluid flowing over the surface.

20. The method of claim 15, wherein the DBD device comprises a plurality of DBD electrodes.

21. The method of claim 20, wherein the determined operation comprises sequentially activating the plurality of DBD electrodes to provide the momentum in the spanwise direction to the fluid flowing over the surface.

22. The method of claim 20, wherein each of the plurality of DBD electrodes has a height less than a hydrodynamic height.

23. The method of claim 20, wherein the plurality of DBD electrodes are arranged in an array extending along at least a spanwise direction, a streamwise direction, or a direction other than the spanwise direction or the streamwise direction.

24. The method of claim 23, wherein each of the plurality of DBD electrodes has a length and a spatial frequency, the length and the spatial frequency of each of the plurality of DBD electrodes varying based on a position of each of the plurality of DBD electrodes.

25. The method of claim 23, wherein each of the plurality of DBD electrodes has a length and a spatial frequency, the length and the spatial frequency of each of the plurality of DBD electrodes varying based on expected local flow conditions of the fluid flowing over the surface.

26. The method of claim 20, wherein the plurality of DBD electrodes are sized to control eddy motions of the fluid flowing over the surface based on the streamwise length scale and the convective time scale.

27. The method of claim 15, wherein the determined operation comprises operating the DBD device to provide the momentum to the fluid flowing over the surface by operating the DBD device according to a temporal frequency, the temporal frequency based on the convective time scale.

28. The method of claim 15, wherein the determined operation comprises operating the DBD device to provide spanwise momentum to the fluid flowing over the surface, the spanwise momentum being between 1% and 20% of a freestream fluid momentum of the fluid flowing over the surface.

29. The method of claim 15, wherein the momentum reduces a skin-friction drag on the surface.

30. A method for adjusting a property of a fluid that flows over a surface, the method comprising:
obtaining a streamwise length scale of a flow regime of the fluid that flows over the surface, wherein the streamwise length scale is between $10\eta$ and $100,000\eta$, where $\eta$ is a viscous length scale of the flow regime of the fluid;
obtaining a convective time scale of the flow regime of the fluid that flows over the surface, wherein the convective time scale is between $10\eta'$ and $10,000\eta$, where $\eta'$ is a viscous time scale of the flow regime of the fluid; and
providing momentum to the fluid in a spanwise direction to adjust a flow property of the flow regime of the fluid based on the streamwise length scale and the convective time scale.

31. The method of claim 30, wherein the flow property is at least one of a flow rate, a velocity, a momentum, a transverse momentum, a shear stress, a velocity profile, a velocity gradient, or a skin-friction coefficient of the fluid.

32. The method of claim 30, wherein providing the momentum to the fluid to adjust the flow property of the flow regime of the fluid comprises operating a dielectric-barrier discharge (DBD) device, the DBD device comprising a plurality of DBD electrodes.

33. The method of claim 32, comprising operating the DBD device to provide spanwise bi-directional momentum to the fluid flowing over the surface.

34. The method of claim 32, wherein providing the momentum comprises sequentially activating the plurality of DBD electrodes to provide the momentum in the spanwise direction to the fluid flowing over the surface.

35. The method of claim 34, wherein the plurality of DBD electrodes are sized to control eddy motions of the fluid flowing over the surface based on the streamwise length scale and the convective time scale.

36. The method of claim 34, wherein providing the momentum to the fluid comprises operating the DBD device to provide the momentum to the fluid flowing over the surface by operating the DBD device according to a temporal frequency, the temporal frequency based on the convective time scale.

37. The method of claim 34, wherein providing the momentum to the fluid comprises operating the DBD device to provide spanwise momentum to the fluid flowing over the surface, the spanwise momentum being between 1% and 20% of a freestream fluid momentum of the fluid flowing over the surface.

38. The method of claim 32, wherein each of the plurality of DBD electrodes has a height less than a hydrodynamic height.

39. The method of claim 32, wherein the plurality of DBD electrodes are arranged in an array extending along at least a spanwise direction, a streamwise direction, or a direction other than the spanwise direction or the streamwise direction.

40. The method of claim 39, wherein each of the plurality of DBD electrodes has a length and a spatial frequency, the length and the spatial frequency of each of the plurality of DBD electrodes varying based on a position of each of the plurality of DBD electrodes.

41. The method of claim 39, wherein each of the plurality of DBD electrodes has a length and a spatial frequency, the length and the spatial frequency of each of the plurality of DBD electrodes varying based on expected local flow conditions of the fluid flowing over the surface.

42. A wind turbine comprising:
a plurality of turbine blades;
a base configured to support the turbine blades, wherein each of the plurality of turbine blades is configured to rotate relative to the base as a fluid flows across the plurality of turbine blades; and
a fluid control system positioned on at least one of the turbine blades, the fluid control system comprising:
a dielectric-barrier discharge (DBD) device; and
processing circuitry configured to:
obtain a streamwise length scale of at least one flow regime of the fluid;
obtain a convective time scale of the at least one flow regime of the fluid; and
operate the DBD device, based on the streamwise length scale and the convective time scale, to provide momentum in a spanwise direction to adjust a flow property of the fluid.

43. The wind turbine of claim 42, wherein the flow property is at least one of a flow rate, a velocity, a momentum, a transverse momentum, a shear stress, a velocity profile, a velocity gradient, or a skin-friction coefficient of the fluid.

44. The wind turbine of claim 42, wherein the fluid control system is configured to adjust the flow property of the fluid to reduce a skin-friction drag on a surface of the wind turbine.

45. An aircraft comprising:
a fuselage;
a component comprising at least one of a wing or a flight control surface coupled with the fuselage; and
a fluid control system positioned on at least one of the fuselage or the component, the fluid control system comprising:
a dielectric-barrier discharge (DBD) device; and
processing circuitry configured to:
obtain a streamwise length scale of at least one flow regime of a fluid flowing over the at least one of the fuselage or the component;
obtain a convective time scale of the at least one flow regime of the fluid; and
operate the DBD device, based on the streamwise length scale and the convective time scale, to provide momentum in a spanwise direction to adjust a flow property of the fluid.

46. The aircraft of claim 45, wherein the flow property is at least one of a flow rate, a velocity, a momentum, a transverse momentum, a shear stress, a velocity profile, a velocity gradient, or a skin-friction coefficient of the fluid.

47. The aircraft of claim 45, wherein the fluid control system is configured to adjust the flow property of the fluid to reduce a skin-friction drag on a surface of the fuselage or the component of the aircraft.

\* \* \* \* \*